(12) United States Patent
Gauker et al.

(10) Patent No.: US 9,003,692 B2
(45) Date of Patent: Apr. 14, 2015

(54) SINGLE USE HERMETICALLY SEALING ENCLOSURE-TYPE MOUSETRAP WITH KILLING MECHANISM

(75) Inventors: Andrew J. Gauker, Shillington, PA (US); Marko Konstantin Lubic, Shillington, PA (US); Gregory Greisman, Elkridge, MD (US)

(73) Assignee: Woodstream Corporation, Lititz, PA (US)

( * ) Notice: Subject to any disclaimer, the term of this patent is extended or adjusted under 35 U.S.C. 154(b) by 485 days.

(21) Appl. No.: 13/427,525

(22) Filed: Mar. 22, 2012

(65) Prior Publication Data

US 2012/0260562 A1    Oct. 18, 2012

Related U.S. Application Data

(62) Division of application No. 12/219,729, filed on Jul. 28, 2008, now Pat. No. 8,146,289.

(51) Int. Cl.
*A01M 23/36* (2006.01)
*A01M 23/30* (2006.01)

(52) U.S. Cl.
CPC ..................... *A01M 23/30* (2013.01)

(58) Field of Classification Search
USPC ............... 43/81, 61, 74, 77, 60, 83.5
See application file for complete search history.

(56) References Cited

U.S. PATENT DOCUMENTS

| | | |
|---|---|---|
| 3,045,384 A | 7/1962 | Gruschow et al. |
| 3,733,735 A | 5/1973 | Hirsch |
| 4,030,230 A | 6/1977 | Souza |
| 4,062,142 A * | 12/1977 | Marotti ............................. 43/61 |
| 4,297,805 A | 11/1981 | Kness et al. |
| 4,369,595 A | 1/1983 | Kness et al. |
| 4,403,438 A | 9/1983 | West-Harron |
| 4,569,149 A | 2/1986 | Sensing et al. |
| 5,148,624 A | 9/1992 | Schmidt |
| 5,588,249 A | 12/1996 | Flinner |
| 5,720,125 A | 2/1998 | Oviatt |
| 5,953,853 A * | 9/1999 | Kim .................................. 43/98 |
| 6,023,878 A | 2/2000 | Fore |
| 6,618,985 B1 | 9/2003 | Kaino |
| 6,758,008 B1 | 7/2004 | Thebolt |
| 7,216,457 B1 | 5/2007 | Hanning |
| 7,231,738 B2 | 6/2007 | Watson et al. |
| 7,506,471 B2 | 3/2009 | Rodgers et al. |
| 7,814,702 B2 * | 10/2010 | Nathan et al. ..................... 43/70 |
| 8,104,222 B2 * | 1/2012 | Hovey ............................ 43/83.5 |
| 8,146,289 B2 * | 4/2012 | Gauker et al. .................... 43/81 |
| 2004/0216364 A1* | 11/2004 | Gosselin .......................... 43/61 |
| 2005/0284015 A1* | 12/2005 | Greisman ........................ 43/60 |
| 2006/0156615 A1* | 7/2006 | Hale ................................ 43/58 |

* cited by examiner

*Primary Examiner* — Christopher P Ellis
(74) *Attorney, Agent, or Firm* — Jacobson Holman, PLLC.

(57) ABSTRACT

A single use, hermetically sealing mousetrap has an enclosure accessible through a rotatably mounted door controlled by a spring-loaded door opening gear mechanism. Inside the enclosure is a spring-actuated setting axle/kill bar and setting bar combination that is movable between a kill position and a set position by manipulation of a setting handle positioned outside the enclosure. When in the set position, the door opening gear mechanism opens the door and tensions a torsional door spring. When the trap is tripped, the kill bar moves rapidly to the kill position which releases the door opening gear mechanism and allows the door spring to close the door and hermetically seal the trap with the dead mouse inside.

22 Claims, 20 Drawing Sheets

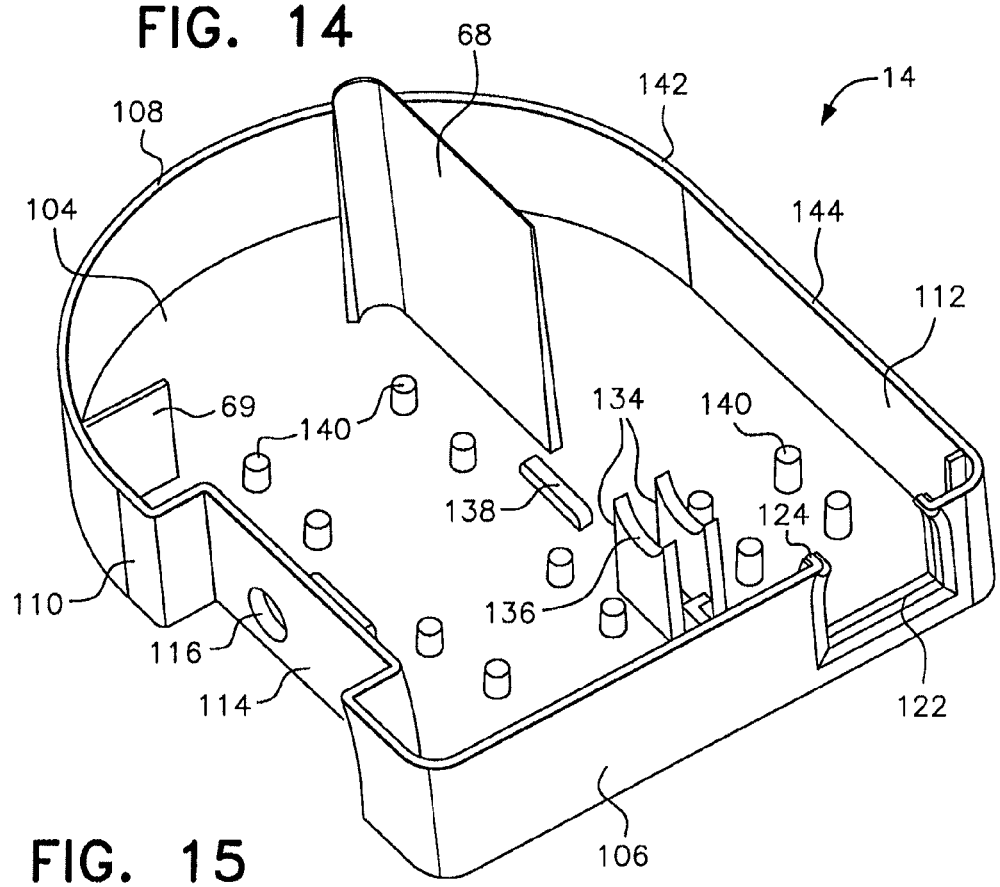
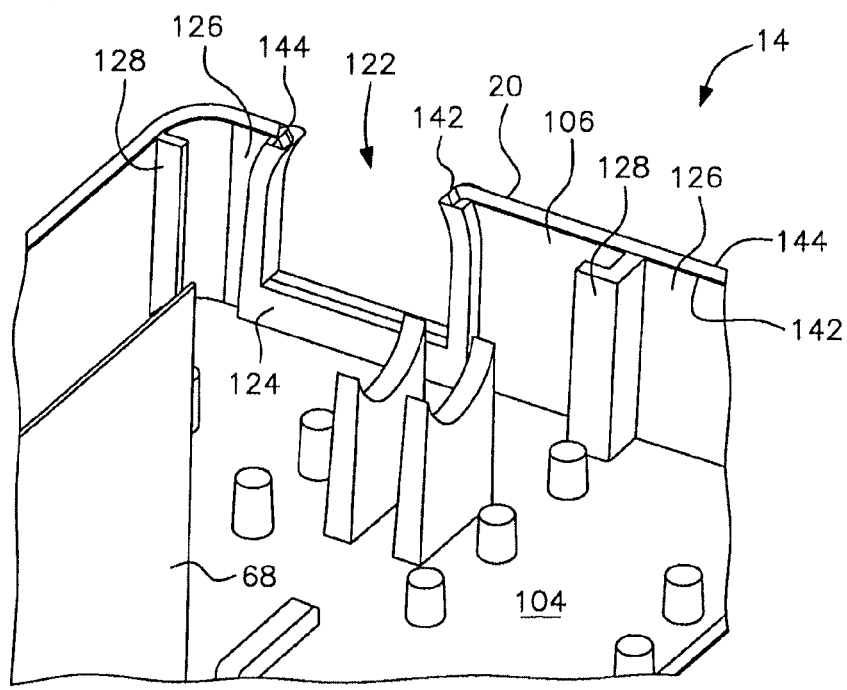

SINGLE USE HERMETICALLY SEALING ENCLOSURE-TYPE MOUSETRAP WITH KILLING MECHANISM

This is a divisional application of U.S. application Ser. No. 12/219,729, filed Jul. 28, 2008, which will issue as U.S. Pat. No. 8,146,289 on Apr. 3, 2012, the priority of which is hereby claimed.

BACKGROUND OF THE INVENTION

1. Field of the Invention

The present invention is related to the field of rodent control and, more particularly, to a single use mousetrap that kills a mouse and encloses the carcass within a hermetically sealed disposable trap enclosure.

2. Description of the Related Art

Present methods of capturing or disposing of rodents are generally unsightly and unsanitary. One such method includes a snap-trap which has a spring operated bar for instantly killing the rodent. This type of trap includes a spring operated bar which is released by a trigger which is baited. Because of their "snapping" action, snap traps are dangerous to humans and pets as well as to rodents, because they can all be struck by it. Furthermore, as mice and other rodents are typically nocturnal animals such devices most frequently capture the animals at night or during periods when people are not around. As such, the rodent may lie in the trap for many hours before removal and disposal. In addition to being unsightly, such capture is unsanitary as rodents are known to carry disease-causing fleas and lice which leave the carcass on death, and bacteria which can spread after the animal is killed. These drawbacks can be serious problems around food handling areas.

Another method of disposing of the rodents is by using poisoned bait which kills the rodent, sometimes by dehydration. The baited traps are also dangerous to children and pets because they may be tempted to taste the bait. Another disadvantage of this method is that the rodent may crawl into some inaccessible area after eating the poison and die there. This prevents disposal of the dead rodent and can result in an unpleasant odor.

SUMMARY OF THE INVENTION

In view of the foregoing, the present invention is directed to a single use snap-trap enclosed within a hermetically sealing housing. The housing has an upper housing and a lower housing that are sealed together to define an airtight enclosure containing the snap-trap with a mouse entry opening. Fixedly connected to the lower housing is a modular base component having a specially designed structural configuration that integrates the setting/killing and door control mechanisms of the trap.

The setting/killing mechanism includes a setting/killing assembly having a setting axle with a setting bar and a kill bar attached thereto or integral therewith so as to rotate with said axle in a fixed relationship, a set spring, a setting handle, a trip latch and a bait pedal. The door control mechanism includes a door assembly and a door opening and closing gear mechanism having a combined axle and lever arm coupled to a spur gear that rotates therewith. The door assembly includes a torsional door spring and a rotationally mounted door that is configured to hermetically seal over the mouse entry opening. The door includes a cylindrical upper part with a central bore that defines the door rotational axis. One end of the cylindrical part is provided with a pinion gear that is operatively engaged with the spur gear so as to be rotated thereby. The torsional door spring is mounted on the door rotational axis with one end applying force against the inner surface of the door and the other end applying force against a front edge of the modular base component.

The setting/killing assembly is positioned in the lower housing inside the enclosure and is movable between a kill position and a set position by manipulation of the setting handle. The setting handle is operatively coupled to the setting axle but is positioned outside the enclosure. Rotation of the setting handle is resisted by the set spring which is tensioned between the lower housing and the kill bar. When the setting axle is moved to the set position by rotation of the setting handle, the set spring is loaded and the setting bar engages the lever arm. Further movement of the setting bar causes the lever arm to rotate on its axle and, in turn, rotate the spur gear and pinion gear which opens the door against the resistance of the torsional door spring.

The trip latch and bait pedal, both rotatably mounted on the setting axle, are configured to operate together to secure the kill and setting bars in the set position. Once set, subsequent movement of the bait pedal by a mouse serves to release the trip latch which, in turn, releases the set and kill bars. The kill bar and setting bar rotate together with the setting axle under the force of the loaded set spring to move rapidly to the kill position. With such rotation of the setting bar, the lever arm is released to counter-rotate on its axle, allowing the spur gear, under the force of the tensioned door spring, to counter-rotate, turning the pinion gear and closing the door. The door is provided with a rubber seal that mates with a flange on the inner wall of the housing to hermetically seal the enclosure with the dead mouse inside. The trap can then be disposed of safely without any contact between the user and the carcass and any parasites and/or pathogens associated therewith.

Accordingly, it is an object of the present invention to provide a single use enclosure-type mousetrap that can be hermetically sealed in a tripped condition in order to protect the user from any exposure to the dead mouse.

Another object of the present invention is to provide a snap-trap enclosed within a housing that is accessible only through a mouse access door and that is set from outside the housing.

A further object of the present invention is to provide a snap-trap in accordance with the preceding objects that includes a door opening and closing gear mechanism that automatically opens the door when the trap is placed in the set position and that automatically closes the door when the trap is triggered by a mouse.

A still further object of the present invention is to provide a snap-trap in accordance with the preceding objects that includes a spring-tensioned kill bar movable from a set position to a kill position to kill a mouse and simultaneously activate the door opening and closing gear mechanism to close the door and contain the carcass and any associated parasites and pathogens within the housing.

Still another object of the present invention is to provide a snap-trap in accordance with the preceding objects in which the door opening and closing gear mechanism includes a lever arm/axle combination coupled to a spur gear that engages a pinion gear on the door, the setting bar when rotated to the set position engaging the lever arm to rotate the gears and open the door while tensioning a door spring.

A further object of the present invention is to provide a snap-trap in accordance with the preceding objects in which rotation of the setting bar toward the kill position when the trap is triggered releases the lever arm, allowing the gears to counter-rotate and the door to close under the door spring tension.

Another object of the present invention is to provide a rodent trap that does not constitute a risk to humans and pets in the area, is easy to use and of simple construction, humanely kills the rodent, and enables the sanitary disposal of the dead rodent.

Yet another object of the present invention is to provide an enclosed snap-trap that is not complex in structure, is reliable in operation and which can be manufactured at low cost but yet efficiently kill and sealingly contain the dead mouse and associated parasites and pathogens.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 14 is an upper perspective view of the lower housing of the mousetrap of FIG. 2.

FIG. 15 is a enlarged view of a portion of the lower housing of FIG. 14 including the lower portion of the access opening.

DETAILED DESCRIPTION OF THE PREFERRED EMBODIMENTS

Figure 1:
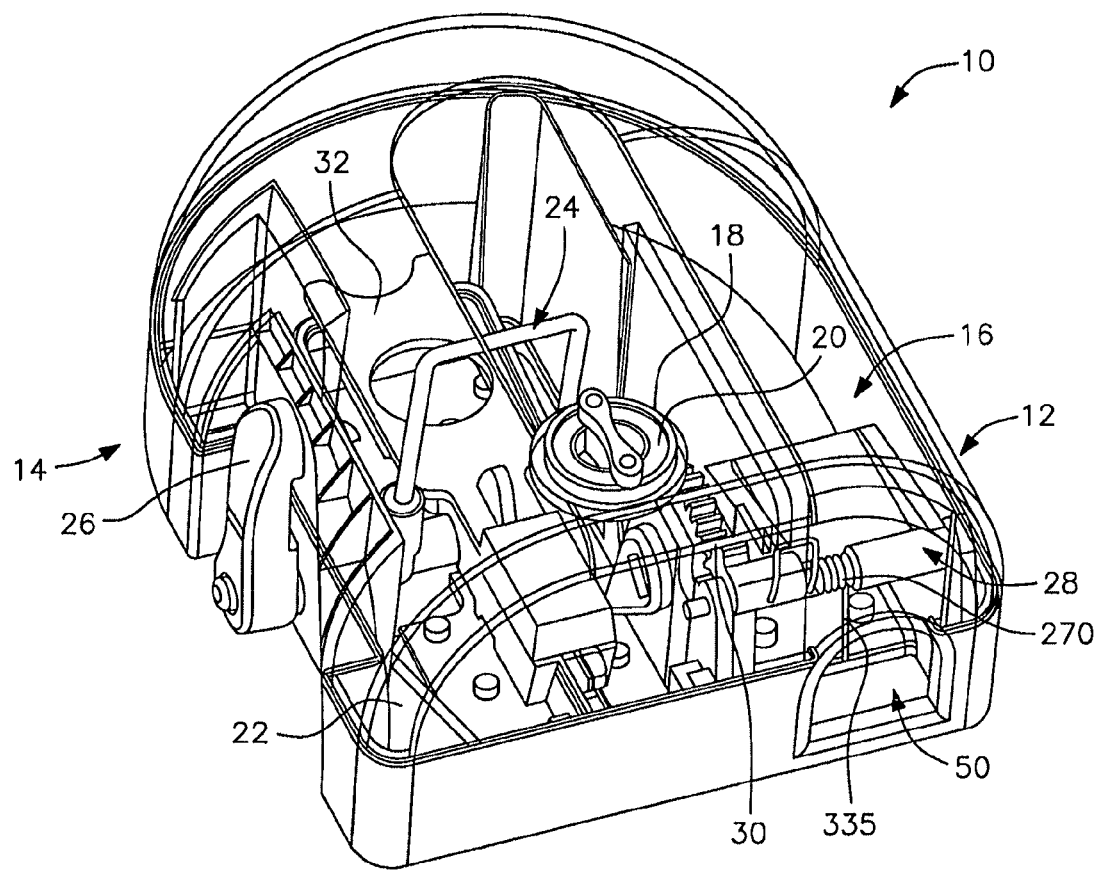
FIG. 1 is a perspective view of a hermetically sealing mousetrap in accordance with the present invention, with the upper housing shown as transparent to reveal the interior of the housing.
Figure 2:
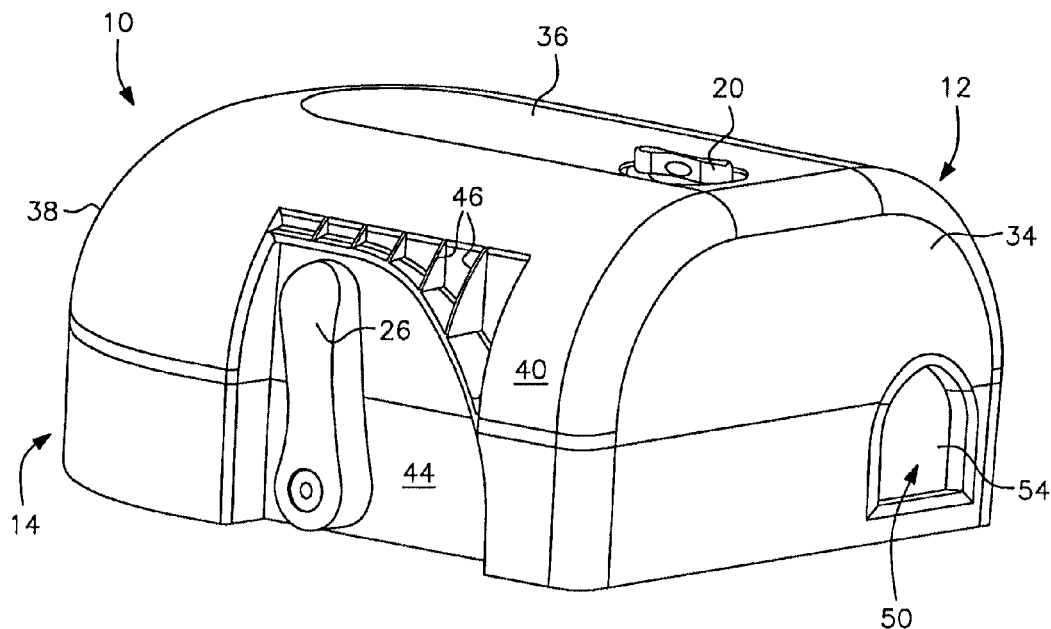
FIG. 2 is a perspective view of the mousetrap of FIG. 1 with the transparency of the upper housing removed.
Figure 3:
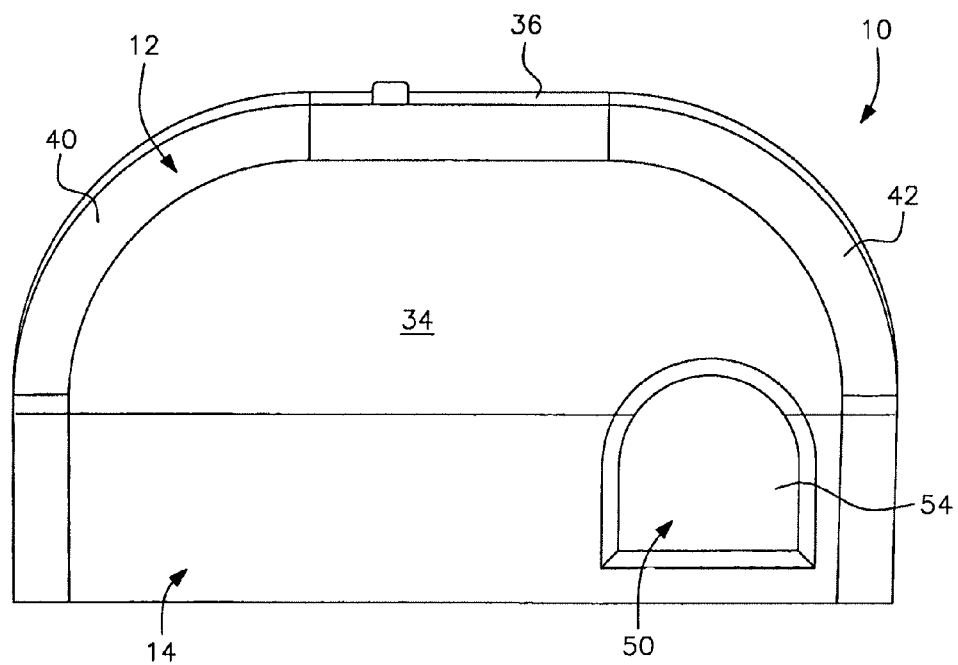
FIG. 3 is a front view of the mousetrap of FIG. 2.
Figure 4:
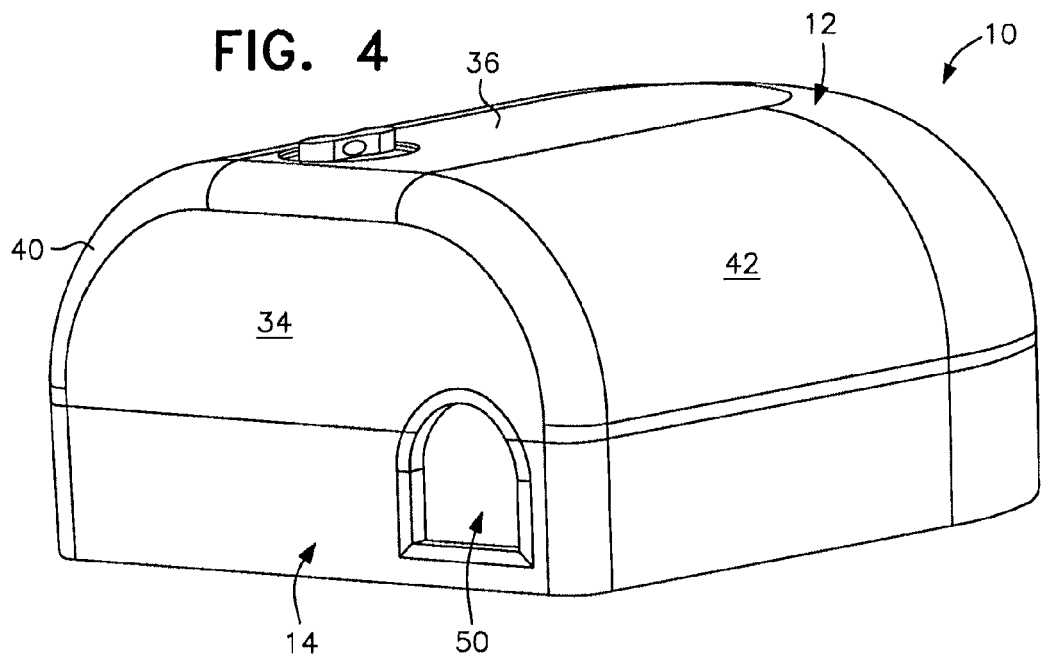
FIG. 4 is another perspective view of the mousetrap of FIG. 2, showing the front and right sides.
Figure 5:
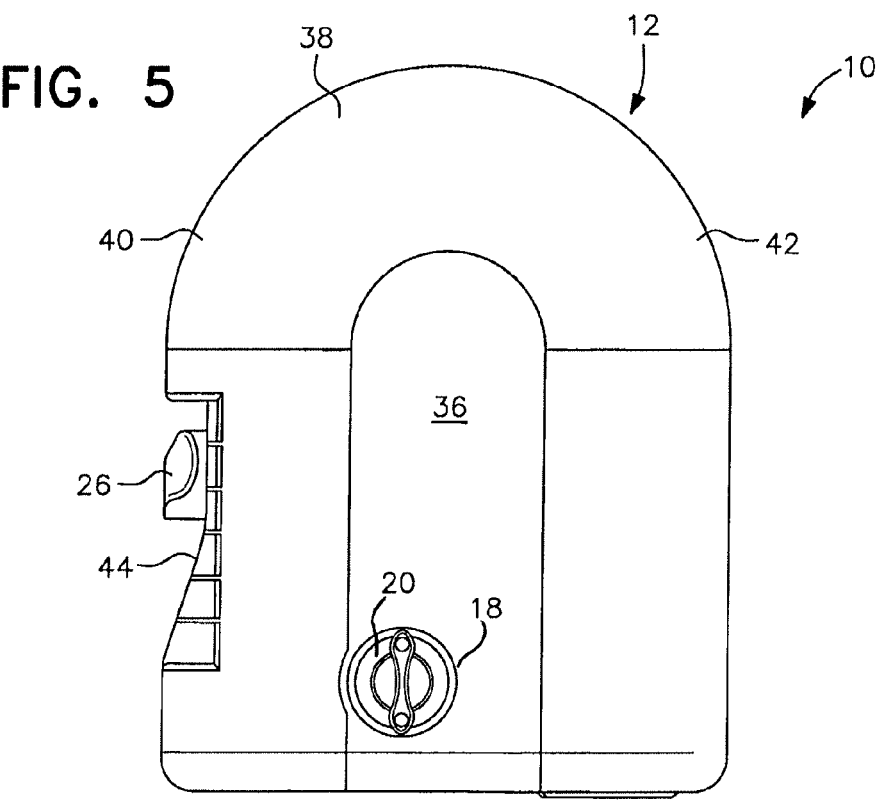
FIG. 5 is a top view of the mousetrap of FIG. 2.
Figure 6:
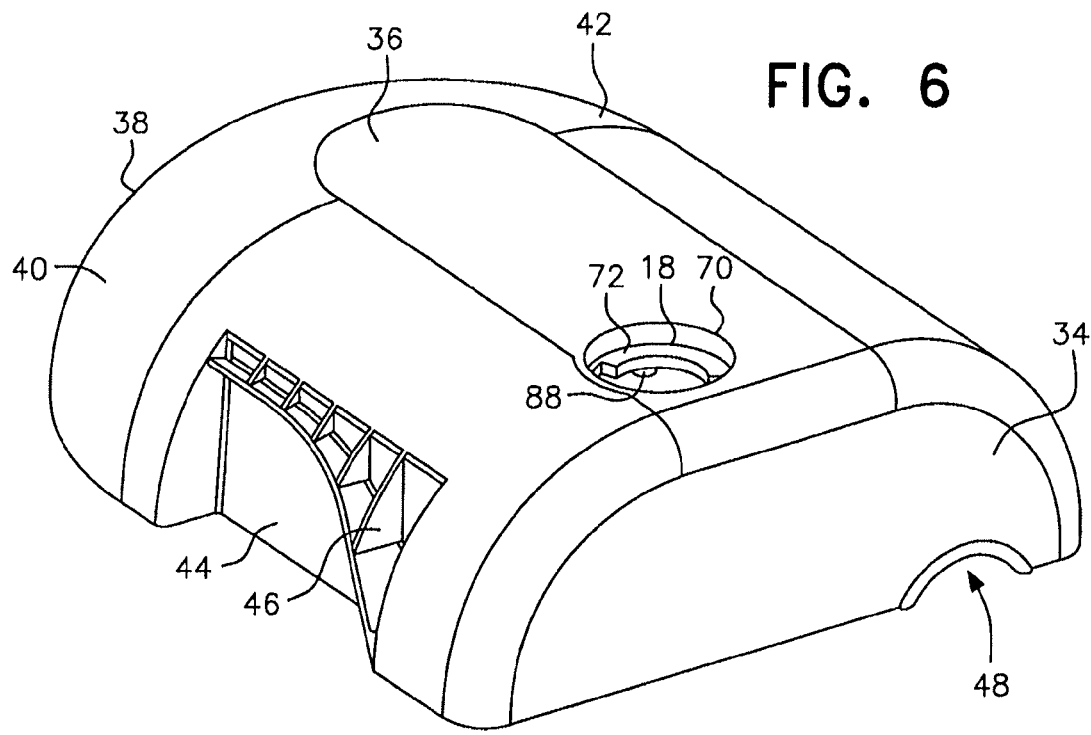
FIG. 6 is a perspective view of the upper housing of the mousetrap of FIG. 2.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

As shown in FIG. 1, the present invention is directed to an enclosed snap-trap for rodents generally designated by reference numeral 10. The trap includes an upper housing generally designated by reference numeral 12 and a lower housing generally designated by reference numeral 14 that are sealed together to define an enclosure generally designated by reference numeral 16. A bait hatch 18 is formed in the upper housing 12 and is sealed with a removable bait plug 20. Secured to the lower housing is a modular base component 22 that integrates the setting/killing and door control mechanisms of the trap.

The setting/killing mechanism includes a setting/killing assembly generally designated by reference numeral 24, a setting handle 26, a set spring 266 (see FIG. 24), a trip latch 172 (see FIG. 26) and a bait pedal 32. The door control mechanism includes a rotationally mounted door assembly generally designated by reference numeral 28, and a door opening and closing gear mechanism generally designated by reference numeral 30. While the trap as shown in FIG. 1 has a transparent upper housing to reveal the components inside the enclosure 16 for purposes of illustration, FIGS. 2-5 illustrate the assembled trap in various views with the upper housing 12 of a solid material as actually embodied for use.

As shown in FIGS. 2-6, the upper housing 12 includes a flat front wall 34, a flat top 36, a rounded back wall 38, rounded left and right sidewalls 40, 42 and a hole in the top 36 forming the bait hatch 18 which is closed by the bait plug 20. The left wall 40 has a recessed area 44 that accommodates the setting handle 26 when the trap is assembled. The adjacently located vertical ribs 46 are included for aesthetic reasons and are not part of the trap functionality.

Figure 7:
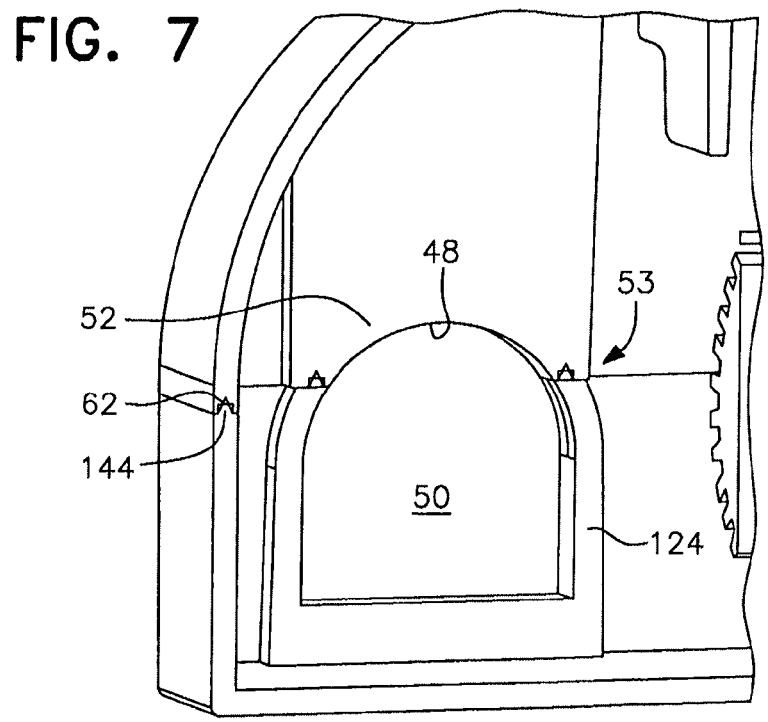
FIG. 7 shows an interior view of the access opening of the mousetrap of FIG. 2 as formed by upper and lower housings.
Figure 8:
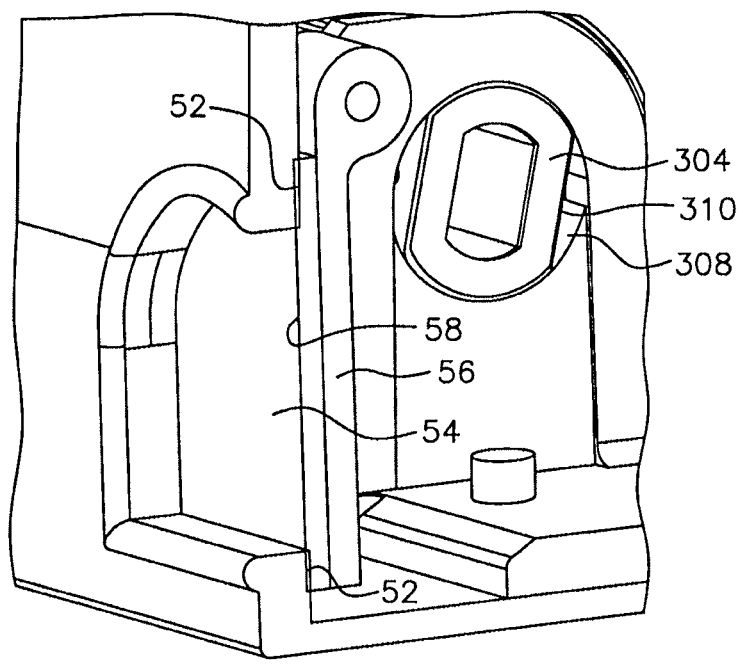
FIG. 8 is a perspective cutaway view of the door, sealing member and access opening of the mousetrap of FIG. 2.
Figure 9:
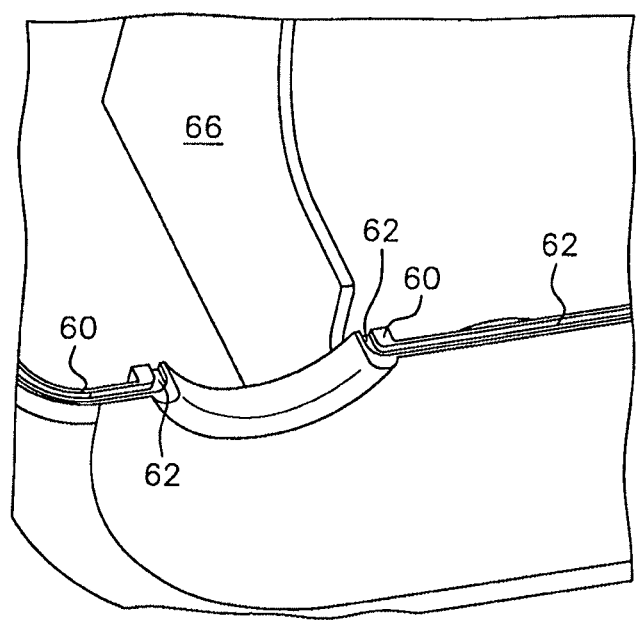
FIG. 9 is a perspective view of the upper portion of the access opening of FIG. 7, shown with the upper housing upside down.

The front wall 34 of the upper housing 12 has a cutout generally designated by reference numeral 48 therein (see FIG. 6) that forms the upper part of the door opening generally designated by reference numeral 50 (see FIG. 1) when the trap is assembled. As shown in FIGS. 7-9, the cutout 48 has an inner flange or lip 52 which is the upper part of a door flange, generally designated by reference numeral 53, that mates with a rubber seal 54 on the door 56 when the door 56 is closed. The door seal 54 is adhered to the outer surface 58 of the door and, when the door is closed, provides a hermetic seal against the mating door flange 53 as will be discussed further hereinafter. The bottom edge 60 of the upper housing 12 has a groove 62, illustrated in FIG. 9, that receives a raised triangular bead 144 on the top edge 142 of the lower housing 14 (see FIGS. 14 and 15) when the upper housing 12 and lower housing 14 are mated and ultrasonically welded together during the assembly process.

Figure 10:
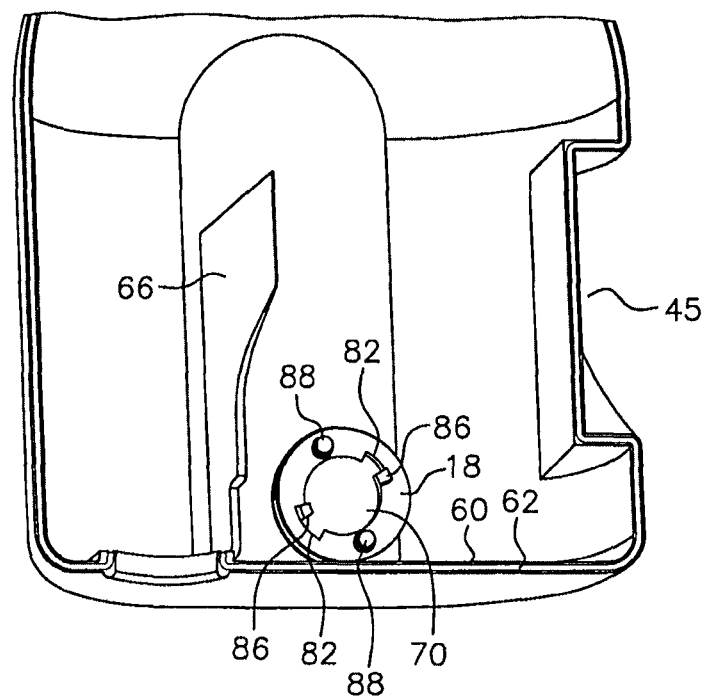
FIG. 10 is a view of the underside of the upper housing of FIG. 6.

The interior of the upper housing, as shown in FIG. 10, includes a dividing wall or barrier 66 that projects downwardly into the trap enclosure when the trap 10 is assembled. This barrier 66 aligns end-to-end with an upwardly projecting dividing wall 68 in the lower housing 14 (see FIG. 14) which, together with the barrier 66, divides the trap enclosure substantially down the middle longitudinally in order to direct the mouse through the enclosure to the bait. Recessed area 45 forms the upper housing component of the setting handle recessed area 44.

Figure 11:
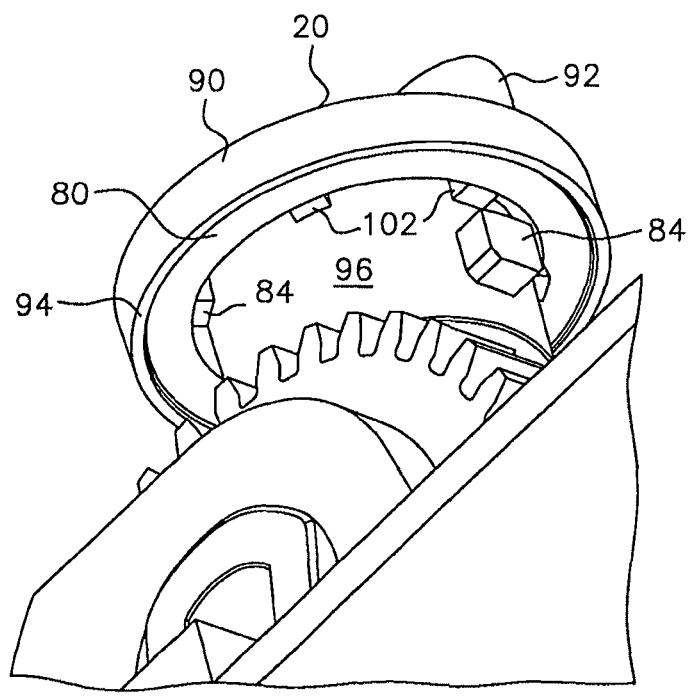
FIG. 11 is a perspective view of the bait plug of the mousetrap of FIG. 2, showing the sealing O-ring.

The bait hatch 18 is preferably located near the front of the trap and includes a round through-hole 70 with a recess 72 (see FIG. 6) that forms a sealing surface against which an O-ring 80 on the bait plug 20, shown in FIG. 11, is seated. The round through-hole 70 has two radial cutouts 82 that receive corresponding tabs 84 on the bait plug 20, allowing the plug to be inserted into the hole. As viewed from the lower surface shown in FIG. 10, the bait hatch 18 is further provided with protruding tabs 86 arranged in a clockwise direction from the cutouts 82 that prevent the bait plug 20 from being rotated counterclockwise during insertion. Located counterclockwise from the cutouts 82 are two posts 88 that serve as stops for the bait plug 20 once it has been inserted and rotated clockwise to the lock position.

Figure 12:
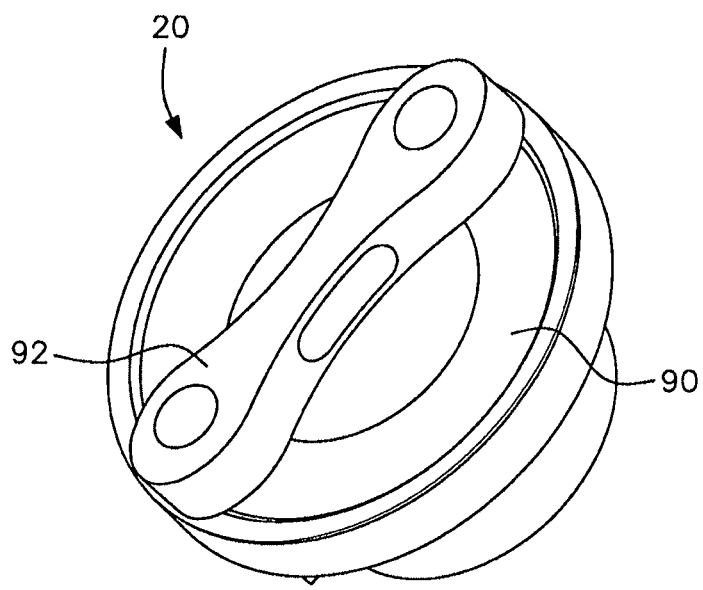
FIG. 12 is a top perspective view of the bait plug of FIG. 11.
Figure 13:
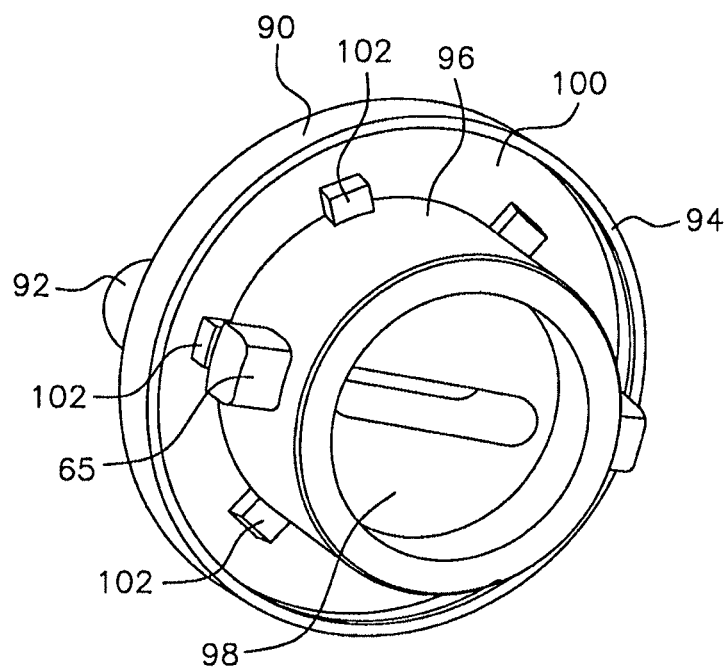
FIG. 13 is a bottom perspective view of the bait plug of FIG. 12.

The bait plug 20, as shown in FIGS. 12 and 13, includes a cap 90 with a handle 92 for rotating the plug during insertion and removal thereof. Attached to or integral with a lower surface 94 of the cap 90 is a cylindrical body 96 having a recess 98 therein for holding bait; preferably the bait is an adherent substance such as spreadable cheese or peanut butter. The lower surface 94 of the cap 90 forms a seating surface 100 for the O-ring (not shown in FIG. 13) once the plug 20 is locked into the hatch 18 and includes a plurality of small pegs 102 that locate the O-ring 90 radially around the cylindrical body 96 for proper seating and sealing. Located axially around the cylindrical body 96 are the previously noted tabs 84 that slide through the cutouts 82 in the bait hatch 18 when the plug 20 is inserted.

Figure 16:
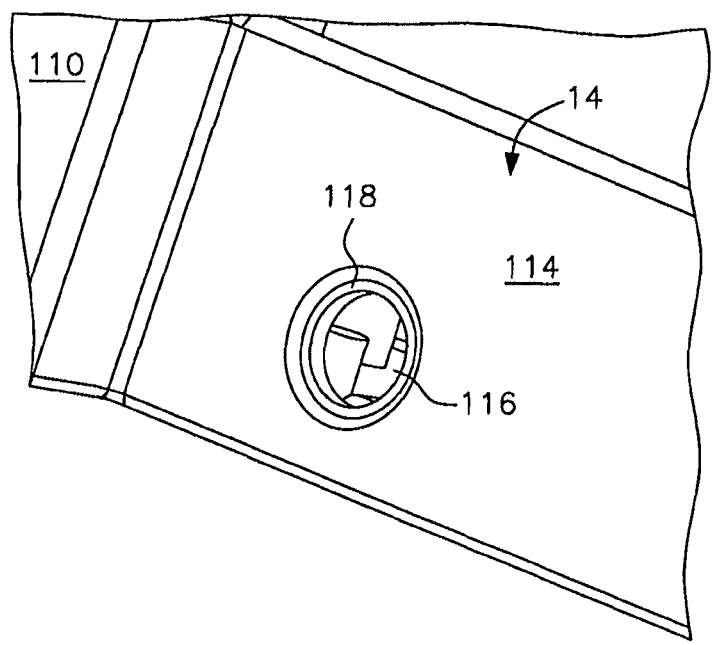
FIG. 16 is a perspective view of a through-going aperture in the lower housing of FIG. 14.
Figure 17:
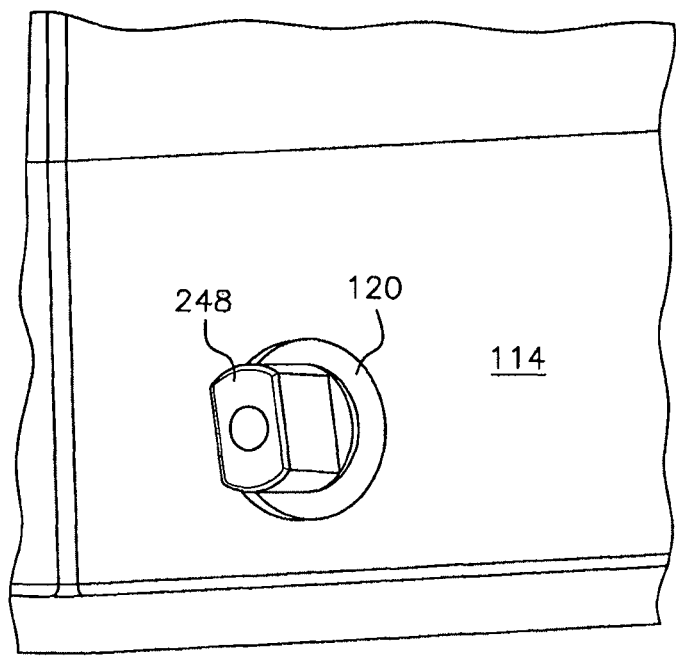
FIG. 17 is a perspective view of the through-going aperture of FIG. 16 shown with the setting axle received therein and a sealing O-ring in accordance with the present invention.

Turning to FIGS. 14 and 15, the lower housing 14 includes a flat bottom 104, a flat front wall 106, and a rounded back wall 108. The front and back walls 106, 108 are joined by substantially straight left and right side walls 110, 112 with the left side 110 having a recessed area 114 that comes into abutment with the recessed area 45 in the upper housing 12 to receive the setting handle 26 when the trap is assembled. The lower housing recessed area 114 includes a through-going aperture 116, shown in greater detail in FIG. 16, for receiving the projecting end 248 of the setting axle 220 (see FIG. 20). The outside of this aperture has a rounded countersunk outer face 118 that provides a seating surface for the setting axle O-ring 120 shown in FIG. 17.

The front wall 106 has a cutout generally designated by reference numeral 122 that forms the lower part of the door opening 50 and is aligned with the cutout 48 in the upper housing 12 when the trap is assembled to complete the door opening 50. The door cutout 122 in the lower housing 14 also has a flange or a lip 124 that, together with flange 52 to form door flange 53, mates with the rubber seal 54 on the door 56 when the door is closed to effect a hermetic sealing of the trap enclosure 16 (see FIG. 8). The inner surface 126 of the front wall 106 has associated mounting elements 128 (see FIG. 15) that serve to slidingly receive tabs 208 and 210 on the modular base component 22 to interlock component 22 with the lower housing 14 in order to enhance the door seal and increase the rigidity of the trap 10.

The bottom 104 of the lower housing 14 includes the previously noted upwardly projecting dividing wall 68 that serves, along with the downwardly projecting wall 66 of the upper housing 12, to divide the trap longitudinally and guide the mouse through the enclosure 16. A further wall 69 is preferably provided that projects inwardly from the left side 110 toward the dividing wall 68 to funnel the mouse toward the bait pedal 32. The lower housing 14 also includes two substantially symmetrical vertical support elements 134 having concave upper surfaces 136 that support the door opening and closing gear mechanism 30, and two low profile strips 138 that raise the setting axle/kill bar 24 off the bottom 104 and work in conjunction with features on the modular base component 22 to accommodate the setting axle 30. Positioned on the lower housing bottom 104 are a plurality of posts 140 that provide material to be melted down during a heat staking process that secures the modular base component 22 to the lower housing 14 during assembly. The upper and lower housings 12, 14 are preferably made of molded plastic and are fused together using a conventional ultrasonic welding process as known by persons of ordinary skill in the art.

The top edge 142 of the lower housing 14 has a raised triangular bead 144 that mates with the groove 62 in the bottom edge 60 of the upper housing 12 for sealing of the upper housing 12 to the lower housing during the ultrasonic welding process.

Figure 18:
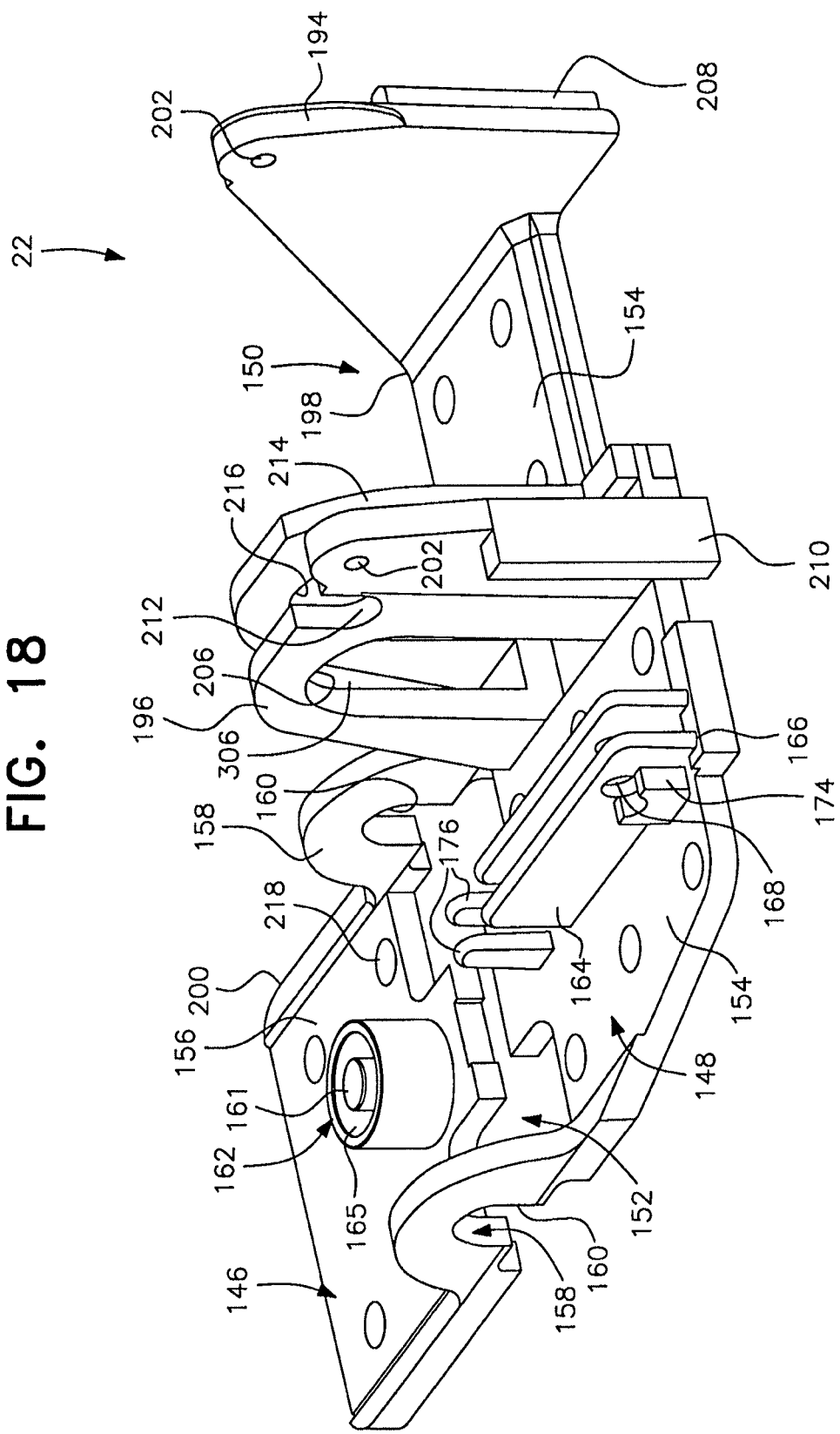
FIG. 18 is a perspective view of the modular base component of the mousetrap of FIG. 1.
Figure 19:
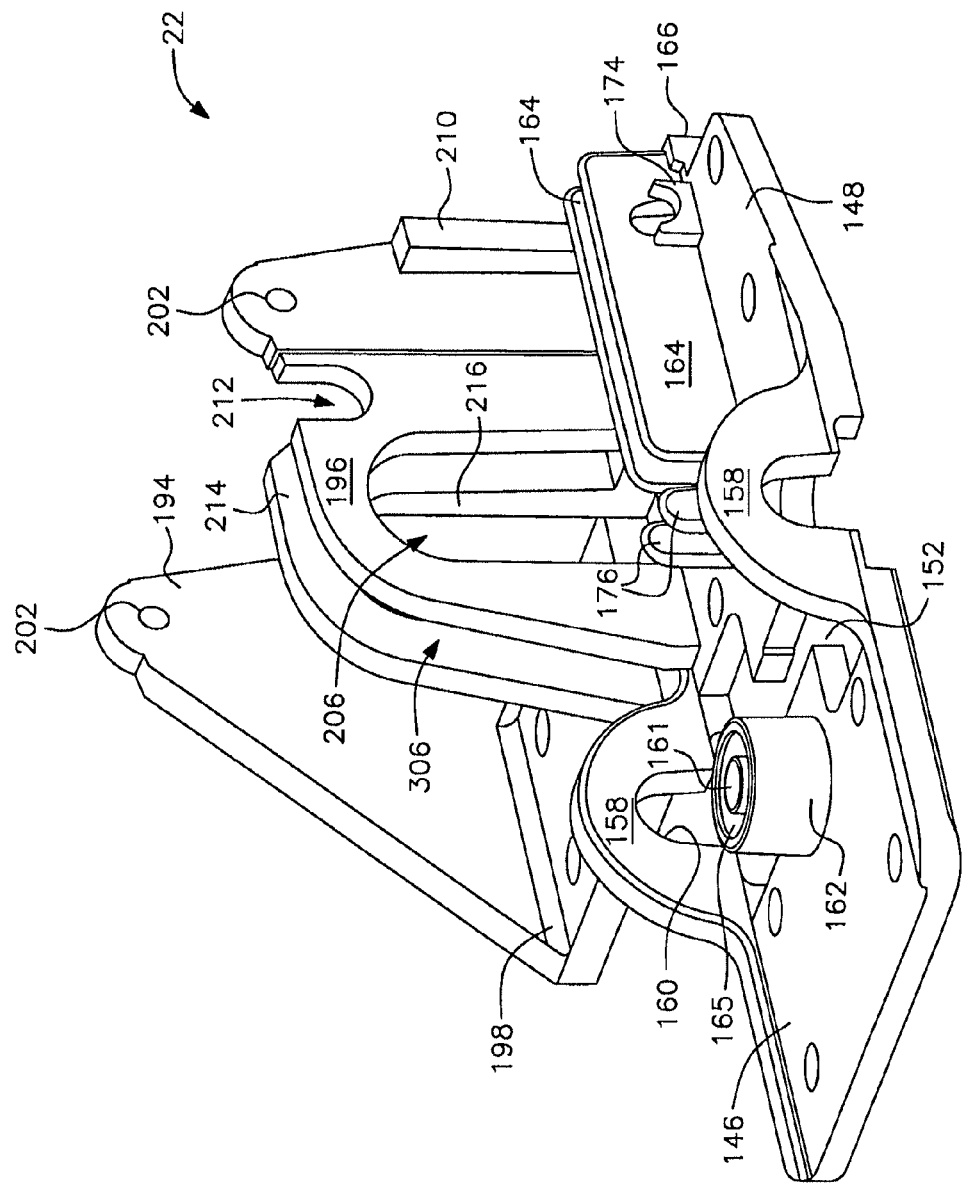
FIG. 19 is another perspective view of the modular base component of FIG. 18.

The modular base component 22 is shown in FIGS. 18 and 19 and serves to integrate the trap setting and door opening elements within the housing and to facilitate assembly. The modular base component 22 includes a generally L-shaped base generally designated by reference numeral 146 which, as arranged in the trap when assembled and looking at the front wall 34, can be described as having a left side generally designated by reference numeral 148 and a right side generally designated by reference numeral 150.

The left side 148 of the base 146 includes a centrally located cutout 152 that divides the left side into a front part 154 and a back part 156 and is shaped to receive the setting axle 30 during assembly. On either side of the center cutout, arcuate vertical members 158 span the gap between the front and back parts 154, 156 formed by the center cutout 152. These arcuate vertical members 158 have rounded cutouts 160 therein that capture the setting axle 30 after trap assembly. The back part 156 of the left side 148 includes an upwardly projecting tubular member 162 concentrically arranged with a central tubular member 161 to define an annular channel 165 within which a spring 163 is mounted (see FIGS. 21 and 24). The spring 163 presses against the underside of the bait pedal 32 to assist in setting the trap as will be described more fully hereinafter.

The front part 154 of the left side 148 has two generally rectangular vertical planar elements 164 that extend linearly back from the front edge 166 toward the back part 156. Aligned apertures 168 in each of these vertical planar elements 164 form a horizontal passageway that captures a metal pin 170 upon which a trip latch 172 (see FIGS. 25 and 26) rotates. The end of the pin 170 rests on a support block 174 (see FIGS. 18 and 19) that projects horizontally from the outer side of one of the vertical planar elements 164. The trip latch 172 is further supported by its placement between the vertical planar elements 164 and an additional pair of vertically projecting arms 176 that are in linear alignment with the vertical planar elements 164. These arms 176 also support a bridge portion 178 of the bait pedal 32 (see FIGS. 27A and 27B) as will be described hereinafter.

Two spaced vertically oriented planar members 194, 196 capture the door 56 and the door opening gear mechanism 30. The outer member 194 is positioned adjacent the right edge 198 of the base and the inner member 196 is positioned inside the right edge 200 of the left side 148. Each of these door capturing members 194, 196 has an aperture 202 therein to receive the door axle 204. The inner member 196 is further provided with a large centrally located opening 206 shaped like an archway that receives the axle, generally designated by reference numeral 296, of lever arm/axle combination, generally designated by reference numeral 300 (see FIGS. 29 and 30). Each of the outer and inner members 194, 196 also includes interlock tabs 208, 210 that fit within the mounting elements 128 of the lower housing 14 to enhance the door seal and increase the rigidity of the structure. The inner member 196 also preferably includes an upper cutout 212 to allow visual alignment of the timing marks of the door opening and closing gear mechanism 30 during assembly as will be described hereinafter.

Spaced to the right of and generally parallel with the inner member 196 is an additional vertically oriented planar member 214 that defines space 306 therebetween. Planar member 214 also has a large centrally located opening 216 for capturing the spur gear 302 of door opening and closing gear mechanism 30 in cooperation with the inner member 196 in space 306 (see FIG. 32).

Finally, the base 146 includes a plurality of holes 218 that are positioned to be in alignment with the plurality of posts 140 on the bottom 104 of the lower housing 14. The posts 140 are received in the holes 218 and, when melted by a heat staking procedure during assembly, further secure the modular base component 22 to the lower housing 14.

Figure 20:
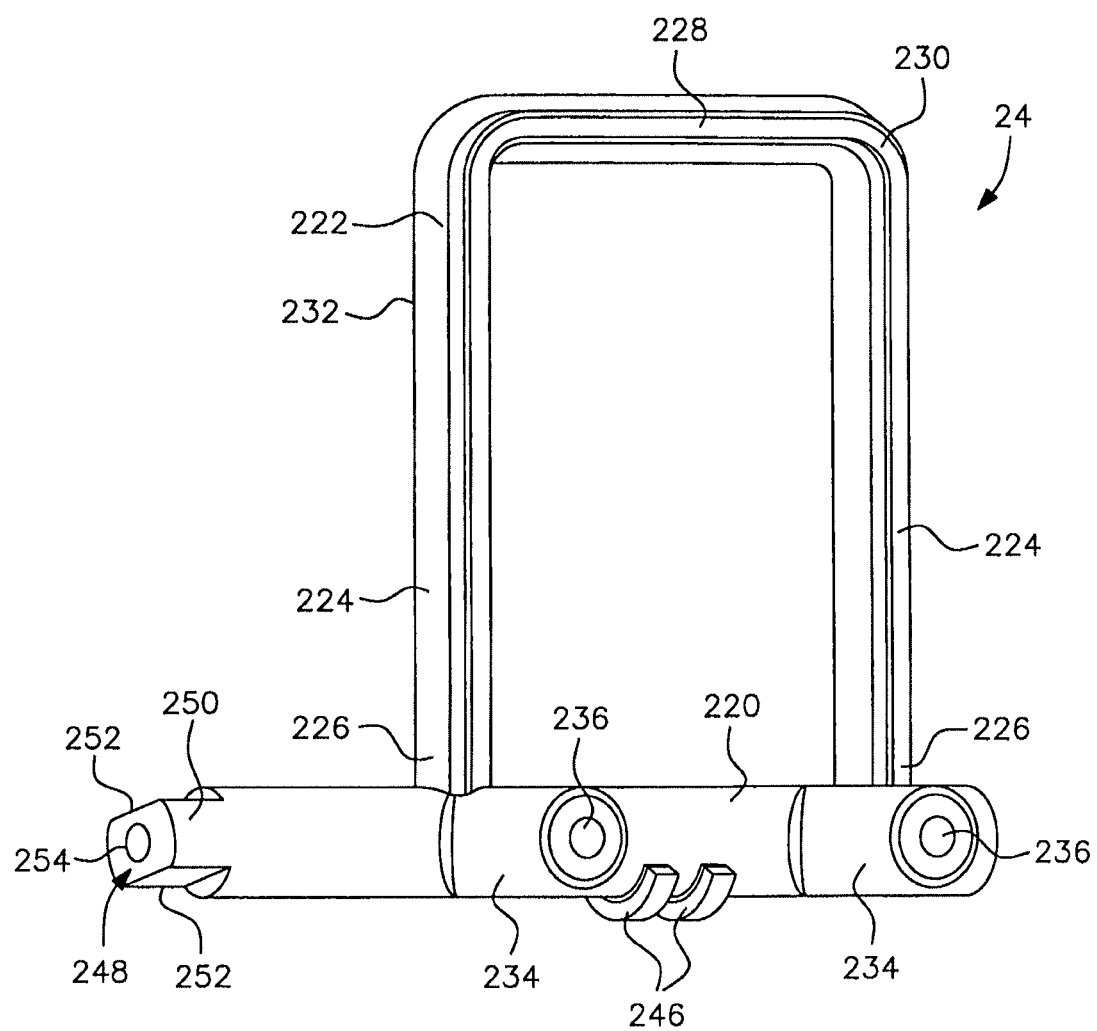
FIG. 20 is a perspective view of the setting/killing assembly of the mousetrap of FIG. 1.
Figure 21:
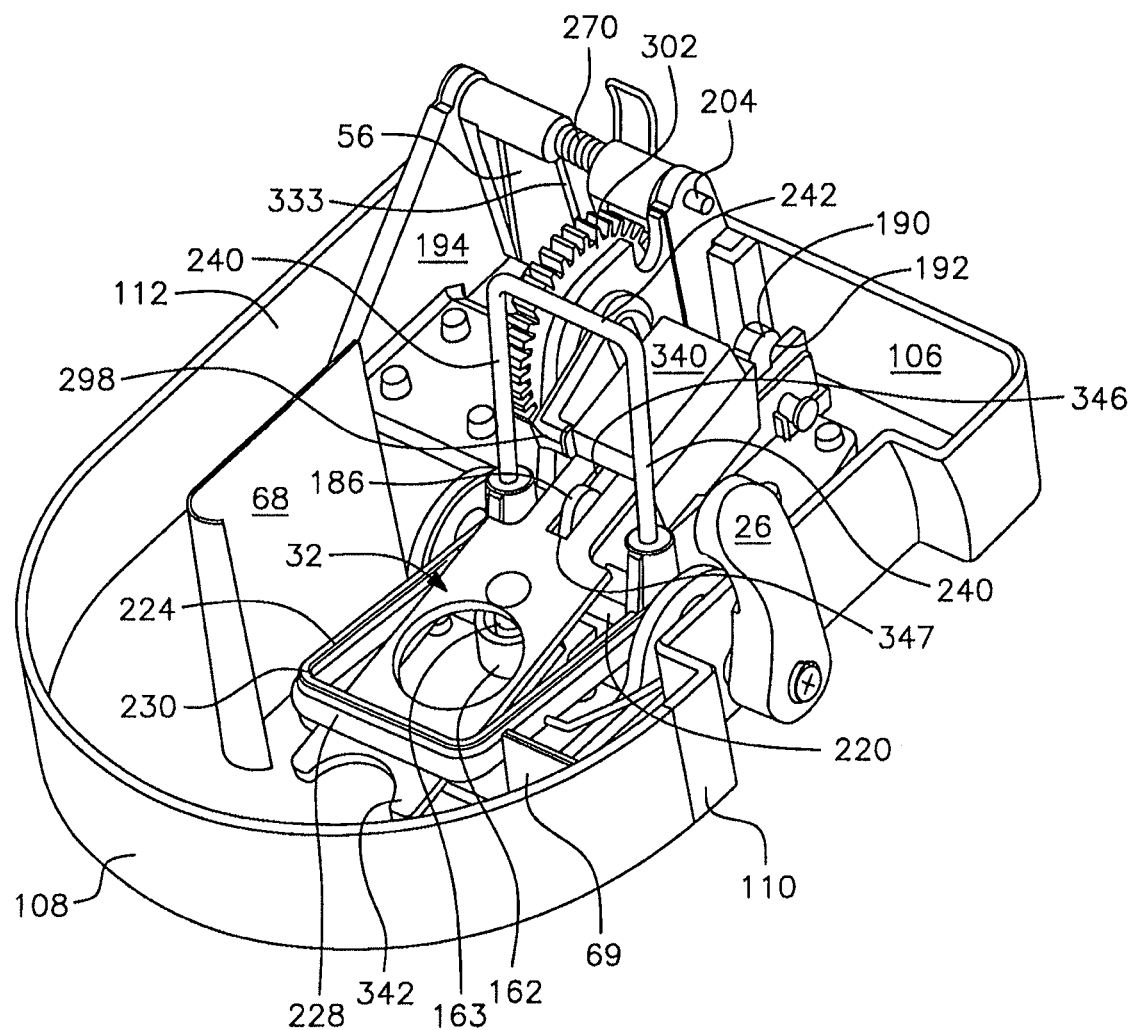
FIG. 21 is a top perspective view of the mousetrap of FIG. 1, with the upper housing removed and showing the various operational components.

As shown in FIGS. 20 and 21, the setting/killing assembly 24 includes a horizontal axle 220 coupled to or integral with a generally rectangular loop that forms the kill bar, generally designated by reference numeral 222, and another generally rectangular loop that forms the setting bar, generally designated by reference numeral 238.

The kill bar 222 is formed by two spaced, generally parallel elongated arms 224 that project perpendicularly from the setting axle 220 at their base ends 226 and are joined at their opposite ends by a horizontal bar 228 that is parallel with the setting axle 220. With the "front" side referring to that side which contacts the pest when the trap is triggered, the arms 224 and the horizontal bar 228 of the kill bar 222 preferably include a square rib 230 on a back side to increase strength, and a pointed, triangular rib 232 on the front side to increase the effectiveness of the killing aspect of the kill bar 222 (see FIG. 29). The setting/killing assembly 24 is preferably molded to include the setting axle 220 and the kill bar 222 as a single piece.

The setting bar 238 is preferably supported within blind central bores 236 formed in two posts 234 that protrude from the axle 220 generally perpendicularly to the kill bar loop 222 as shown in FIG. 21. Like the kill bar 222, the setting bar 238 has two arms 240 joined at their distal ends by a horizontal bar 242. The arms may be press fit into the central bores 236 or, alternatively, may be molded as a single piece with the setting axle 220 and the kill bar 222.

Located centrally on the setting axle 220 between the base ends 226 of the kill bar 222 are two spaced ridges 246 that serve to locate the bait pedal 32 laterally on the setting axle 220. The left end, generally designated by reference numeral 248, of the axle 220 is received in the through-going aperture 116 in the recessed area 114 of the lower housing 14. A protruding portion 250 of the left end 248 of the axle has parallel flats 252 that engage corresponding flats 253 of the cutout 262 on the inside of the setting handle 26 (see FIG. 23) and an axial hole 254 to receive a fastening element, such as a screw (not shown), to secure the setting handle 26 in place during assembly.

Figure 22:
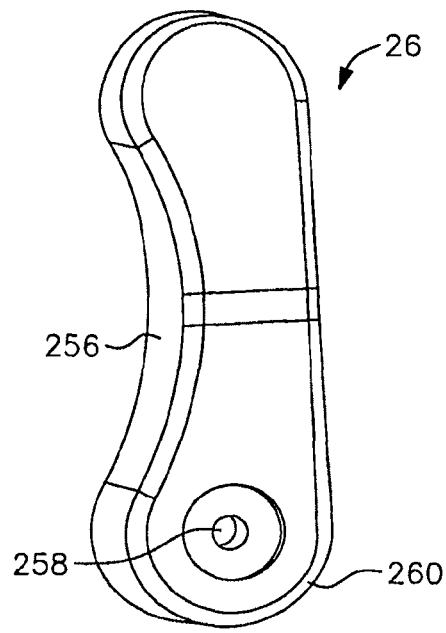
FIG. 22 is a perspective view of the outside of the setting handle of the mousetrap of FIG. 1.
Figure 23:
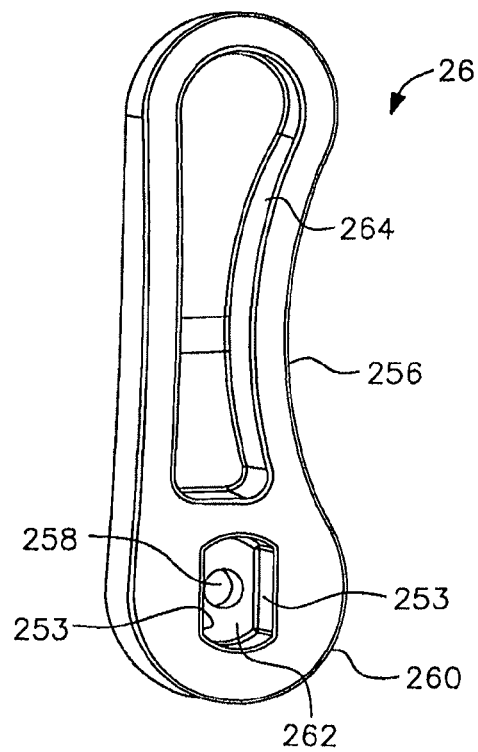
FIG. 23 is a perspective view of the inside of the setting handle of FIG. 22.

The setting handle 26, shown in FIGS. 22 and 23, is preferably formed as a single piece having a curved side 256 to fit the user's thumb to facilitate pushing the handle 26 to set the trap 10. A through-going aperture 258 is located adjacent the lower end 260 of the handle 26 and is aligned with the axial hole 254 in the setting axle 220 to receive the fastening element that secures the handle 26 to the setting axle 220. The back of the handle, shown in FIG. 23, has cutout 262 around the through-going aperture 258 that mates with the left end 248 of the setting axle 220, as previously described. A further cutout 264 may be provided to reduce the weight and amount of material needed for the handle.

Figure 24:
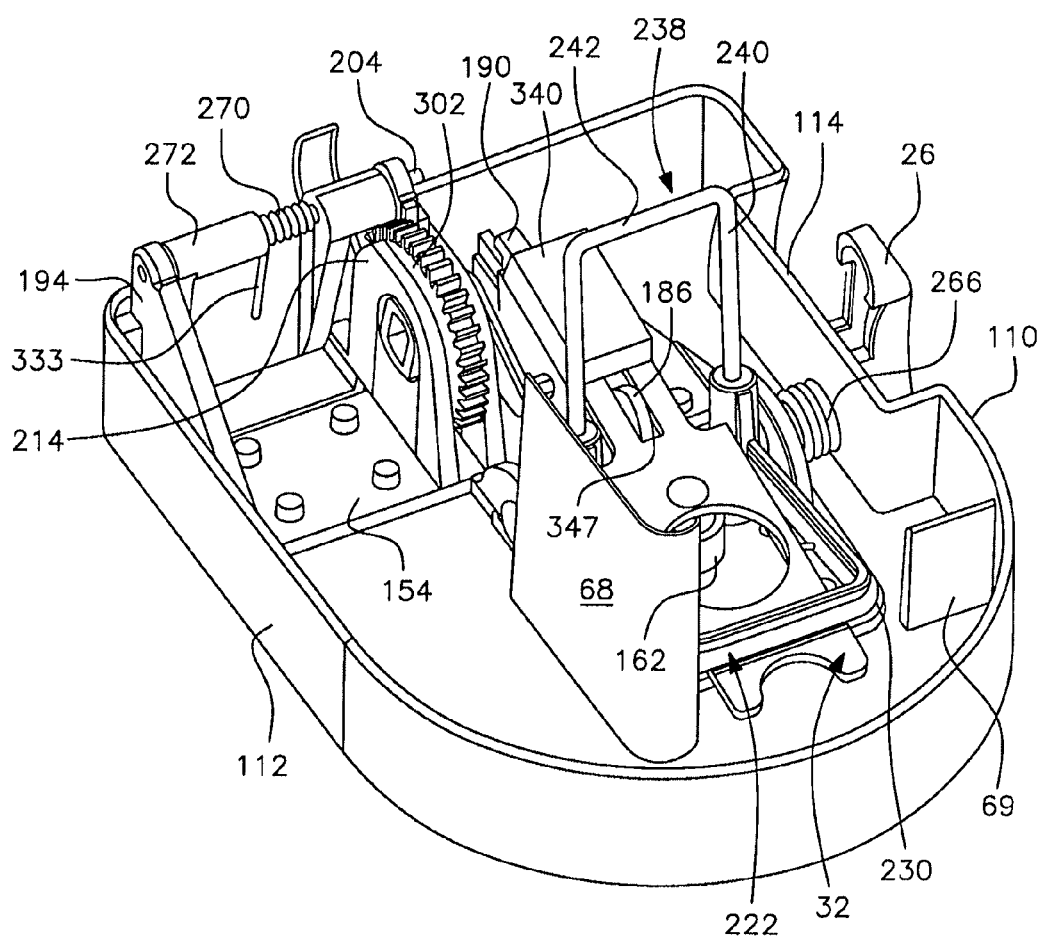
FIG. 24 is a partial perspective view of the mousetrap of FIG. 1, with the upper housing removed and showing certain of the operational components.

An upper view of the setting/killing assembly 24 in the kill position is provided in FIG. 24. The axle 220 is received in the through-going aperture 116 in the recessed area 114 of the lower housing 14 and in the through-going aperture 258 in the handle 26. A set spring 266 is mounted on the axle 220 between the arcuate vertical member 158 and the inner wall 268 of the recessed area 114. One end 265 of the spring 266 is hooked over and applies force to the kill bar and the other end 267 is held in place against the bottom 104 of the lower housing 14.

Figure 25:
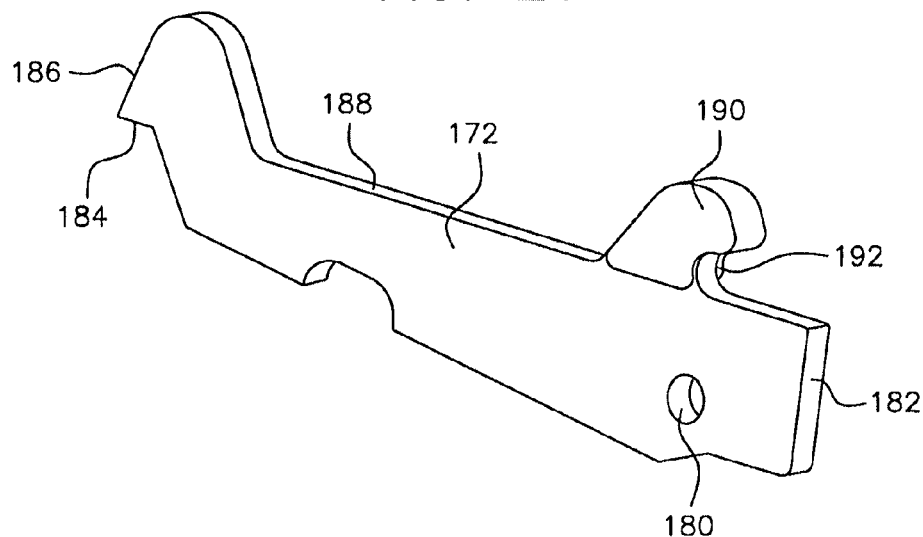
FIG. 25 is a perspective view of the trip latch of the mousetrap of FIG. 1.
Figure 26:
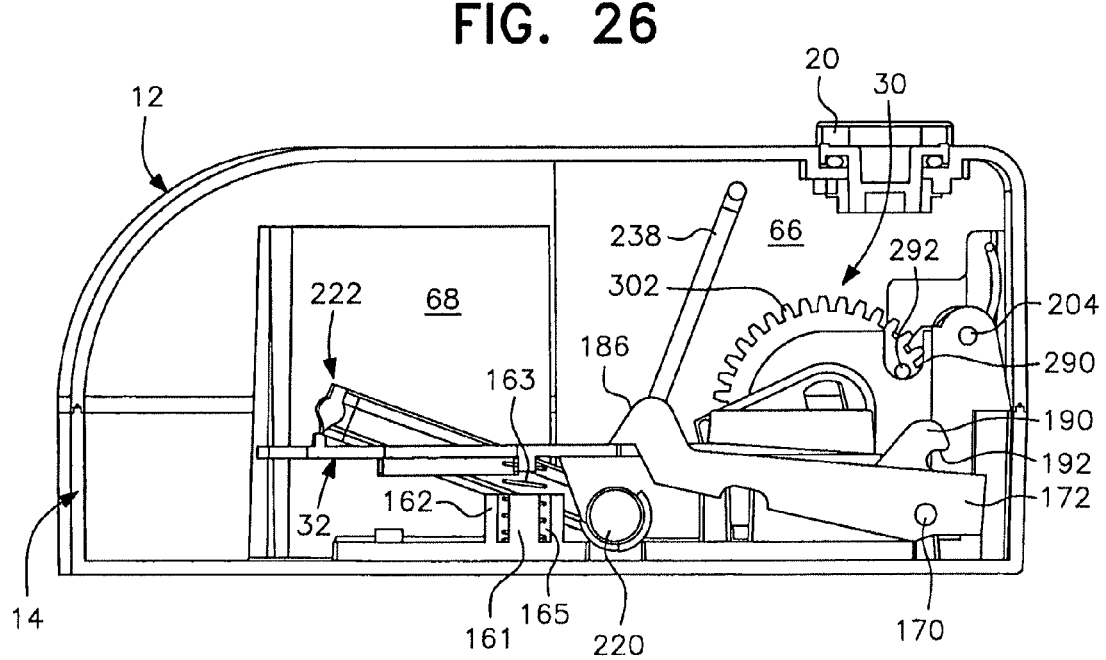
FIG. 26 is a side cutaway view of the mousetrap of FIG. 1 showing the trip latch as mounted therein.

As shown in FIGS. 25 and 26, the trip latch 172 is an elongated generally planar member having an aperture 180 adjacent a first end 182 for receiving the metal pin 170 upon which the trip latch rotates, and a tripping tip 184 at an opposite second end 186. Projecting from the trip latch upper surface 188 is a setting hook 190 that defines a recess 192 for securing the setting bar 238 when the trap 10 is in the set position as will be described further hereinafter. In the cutaway view of FIG. 26, the trip latch 172 is not set.

Figure 27A:
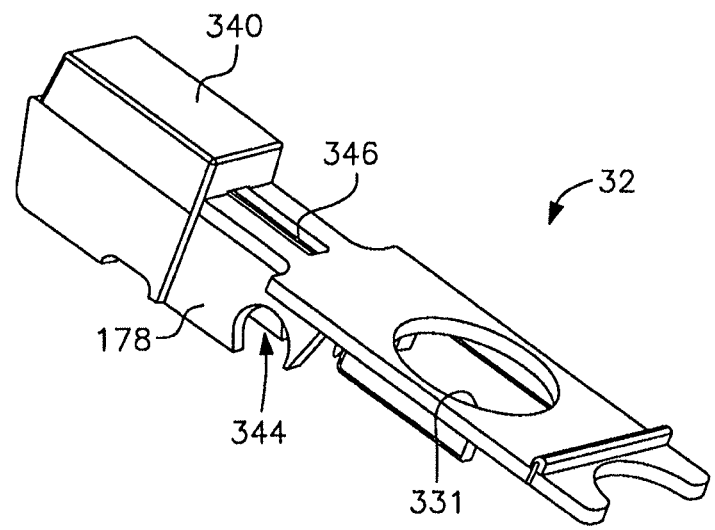
FIG. 27A is a top perspective view of the bait pedal of the mousetrap of FIG. 1.
Figure 27B:
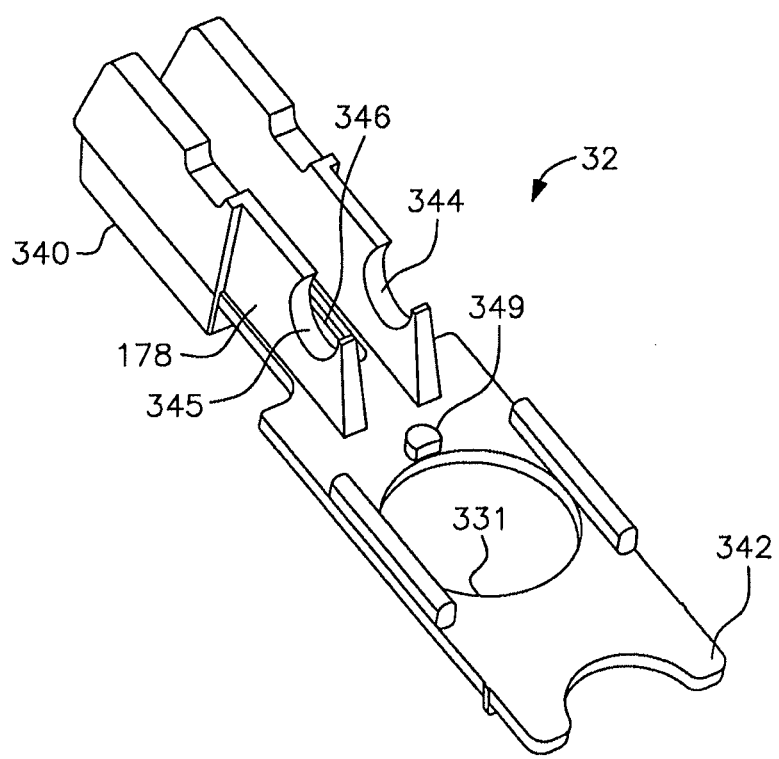
FIG. 27B is a bottom perspective view of the bait pedal of FIG. 27A.

As shown in FIGS. 27A and 27B, the bait pedal 32 is preferably of a single piece construction, most preferably molded polymer, and includes a weighted end 340 and a back end 342 joined by a bridge portion 178. The bridge portion 178 has a pair of aligned bottom cutouts 344, 345 for snapping the bait pedal 32 onto the setting axle 220 during trap assembly, and a central cutout 346 that latches with the tripping tip 184 of the trip latch 172 when the trap is set (see FIG. 29). A circular cutout 331 may also be provided in the back end 342 to reduce weight and material. The bait pedal 32 rotates freely about the setting axle 220 and is located longitudinally thereon by the ribs 246 on the setting axle which, when positioned between the cutouts 344, 345, ensure that the bait pedal is lined up with the rest of the setting mechanism (see FIGS. 20 and 27B).

As shown in FIG. 27B, the bottom of the bait pedal includes a projection 349 that, when the trap is assembled, is positioned over the tubular member 162. The spring 163, mounted within the annular channel 165 formed by tubular member 162 with central member 161, receives the projection 349 in the center of the coils (see FIG. 26). Engagement of the spring 163 with the projection 349 ensures proper alignment of the bait pedal 32 and also provides upward pressure against the underside of the back end 342 when the trap is being set. With this upward pressure, the trap can be set by the user while being held in any spatial orientation.

Figure 29:
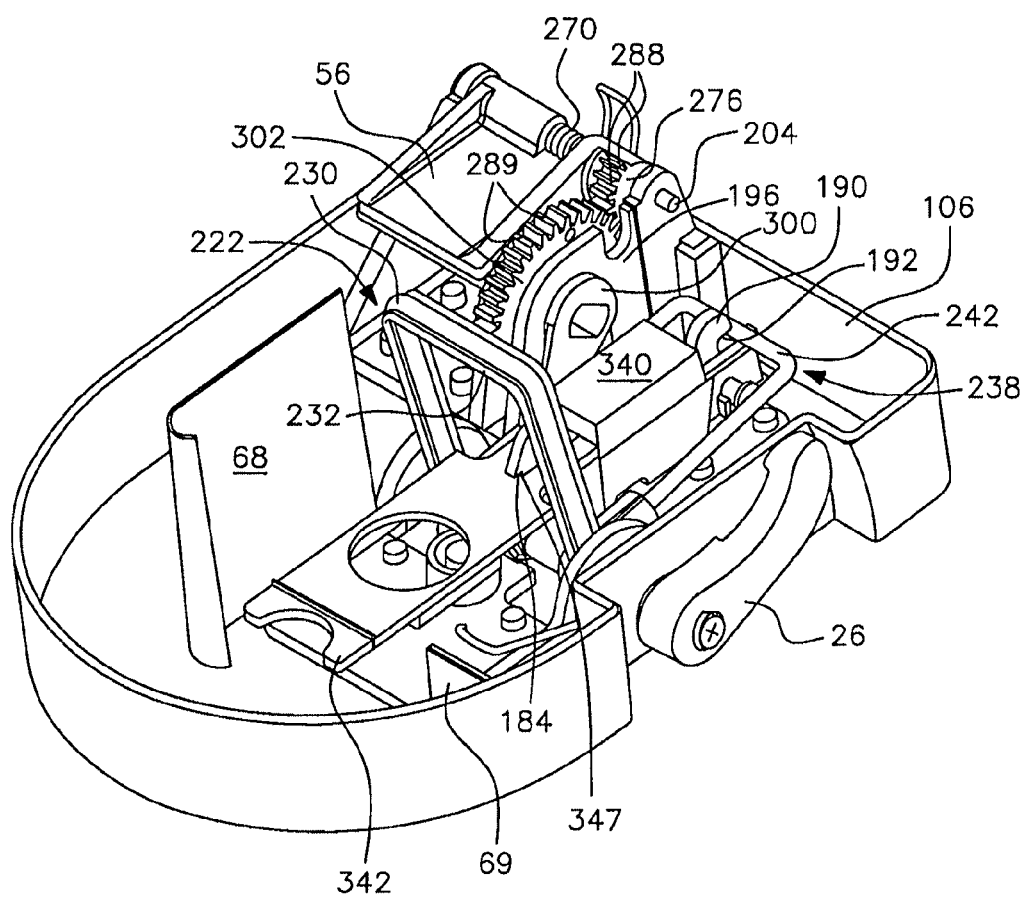
FIG. 29 is a perspective view of the mousetrap components of FIG. 21, shown in the set position.

To set the trap, the user holds the trap with one hand while pushing the setting handle 26 down over a travel range of approximately 90 degrees until the setting bar 238 locks with the trip latch 72. This can be visualized with reference to FIGS. 21 and 24 from which shown position the setting handle is rotated clockwise toward the front wall 106 of the lower housing 14 until the trap is set as shown in FIG. 29. This handle rotation rotates the setting axle 220 and the setting bar 238 toward the front wall 106 where the horizontal bar 242 passes over the setting hook 190 and is received in the recess 192. With the kill bar concurrently rotated upwardly off the back end 342 of the bait pedal 32 as the setting bar is rotated, the weighted end 340 of the bait pedal causes the bait pedal to rotate on the setting axis, lowering the weighted end and allowing the back end 342 to lift off of the bottom of the lower housing. In addition, the pressure of the spring 163 against the underside of the back end 342 ensures the upward positioning of the back end, once the kill bar has been lifted, regardless of the angle at which the trap is being held during the setting process. According to a preferred embodiment, when the back end is in the "upward position", the bait pedal is substantially parallel with the bottom of the trap.

More particularly, when the setting bar 238 contacts and presses downwardly on the setting hook 190 of the trip latch 172, the tripping tip 184 thereof moves upwardly through the central cutout 346. The upward positioning of the back end 342 of the bait pedal, as maintained by the pressure of the spring 163, allows the tripping tip 184 of the latch 172, once the setting bar has moved into recess 192, to catch on the back edge 347 of the cutout 346. With the trip latch 172 thus held at both ends, the setting hook 190 being tensioned upwardly by the setting bar 238 and the tripping tip 184 caught on the edge 347 preventing the second latch end 186 from moving downwardly, the trap is set.

When the trap is set, force applied by the mouse when it steps on the back end 342 rotates the bait pedal sufficiently to release the tripping tip 184 from the edge 347 of the central cutout 346, allowing the trip latch 172 to rotate on the metal pin 170 which, due to the tension of spring 266 on the setting bar 238, raises the setting hook 190 to release the setting bar 238. The kill bar 222 is then free to rotate rapidly from the set position shown in FIG. 29 to the kill position shown in FIG. 24 where the horizontal bar 228 of the kill bar 222 presses downwardly under spring tension against the back end 342 of the bait pedal 32.

Figure 28:
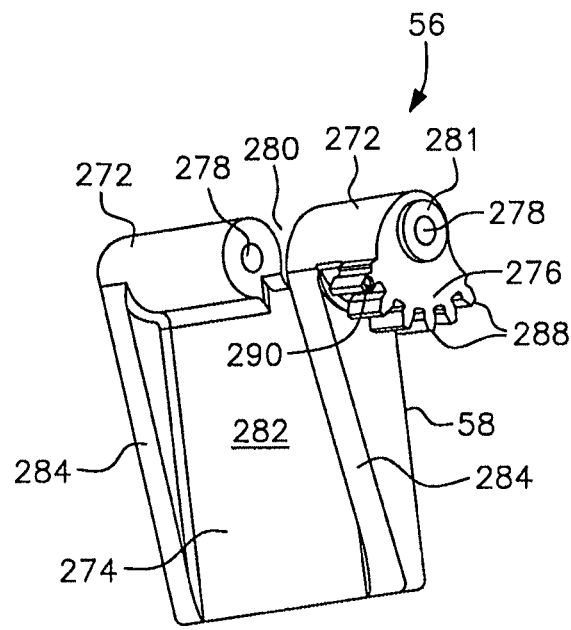
FIG. 28 is a perspective view of the door of the mousetrap of FIG. 1.

Concurrently with setting of the kill bar 222, the door assembly 28 is automatically moved to an open door position by the door opening and closing gear mechanism 30. As shown in FIGS. 21, 28 and 29, the door assembly 28 includes a door 56, the door axle 204 and a door spring 270.

The door 56 includes a cylindrical top section 272, a flat plate 274, and a partial pinion gear 276 on the left end (as viewed from the front of the assembled trap) of the cylindrical section 272. The cylindrical section 272 has an axial bore 278 through which the door axle 204 extends to enable rotation of the door 56, and a cutout 280 to accommodate the door spring 270 through which the door axle 204 also passes (see FIGS. 21 and 29). Thin rings 281 are located at each end of the cylindrical section 272 for proper spacing of the door 56 between the corresponding vertically oriented planar members 194, 196 on the modular base component 22.

The flat plate 274 has a front surface 58 for adhesion of the rubber door seal 54 (see FIG. 8). The back surface 282 of the plate 274 is provided with reinforcement ribs 284 that extend in alignment with the sides of the plate and are preferably tapered from the cylindrical section 272 toward the free end 286 of the door.

The door seal 54 is adhered to the front surface 58 of the plate 274 and is preferably made of a rubber material. Other elastomeric materials that are sufficiently soft or compressible to form a good seal with the door flange 53 when subjected to the disclosed spring tension may also be used. When the trap is tripped and the door 56 is closed, the door seal 54 and the door flange 53 form a hermetically sealed trap for retaining the trapped (killed) pest and its related parasites and pathogens. As used herein, the terms "hermetically sealed" and "hermetic seal" are intended to mean a closed trap having a vacuum inside the trap enclosure, such as enclosure 16, of between about 1.0 mmHg and about 25.9 mmHg. Stated another way, the seal can withstand a pressure of between at least 0.125 inches $H_2O$ to about 55.4 inches $H_2O$. As known to those skilled in the art, these parameters can be measured using a leak and flow tester such as the SPRINT-LC manufactured by Uson LP of Houston, Tex.

The partial pinion gear 276, located on the left side of the cylindrical section 272, is configured with a plurality of teeth 288 to mesh with teeth 289 of the spur gear 302 of the door opening gear mechanism 30. A timing mark 290 is provided on the side of the pinion gear 276 that aligns with a timing mark 292 on the door opening gear mechanism 30 (see FIG. 26). During assembly in the unset position, the timing marks 290 and 292 should be side-by-side, as shown in FIG. 26. This alignment ensures that the spur gear 302 will rotate the pinion gear 276 to fully open the door 56 when the trap is set by rotating the setting handle 26.

The door axle 204 is preferably a steel wire or rod that passes through the bore 278 of the door cylindrical section 272 and is press fit through the horizontal holes 202 in the outer and inner vertically oriented planar members 194, 196. The door spring 270 is a torsional spring located around the door axle 204 and in the cutout 280 in the cylindrical section 272. One end 333 of the spring contacts and applies force to the back side 282 of the flat plate 274 of the door (see FIG. 21). The other end contacts and applies force against the inside of the front wall 34 of the upper housing above the door opening 50 (see FIG. 1).

Figure 30:
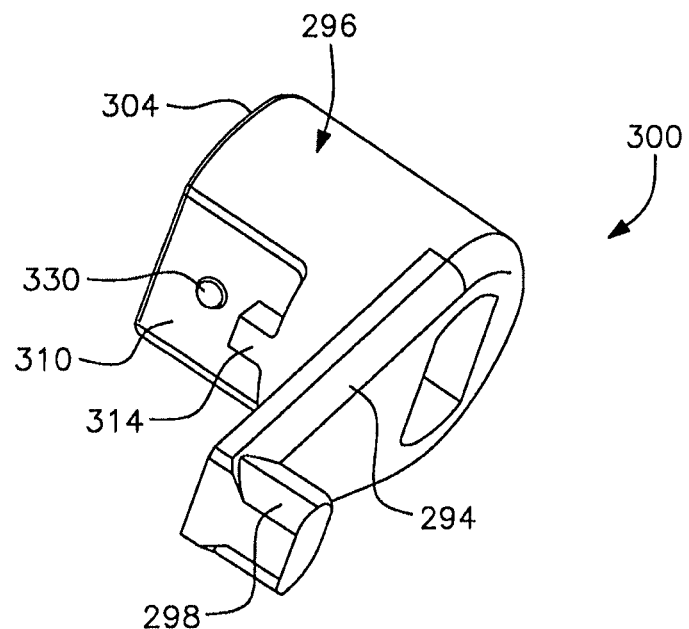
FIG. 30 is a perspective view of the lever arm/axle combination of the door opening gear mechanism of the mousetrap of FIG. 1.
Figure 31:
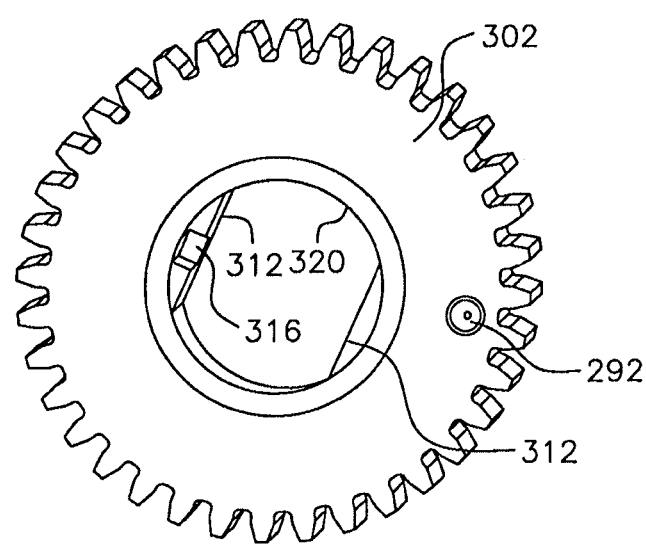
FIG. 31 is a perspective view of the spur gear of the door opening gear mechanism of the mousetrap of FIG. 1.

As shown in FIGS. 30 and 31, the door opening and closing gear mechanism 30 includes the lever arm/axle combination, generally designated by reference numeral 300, and the spur gear 302 that works cooperatively with the partial pinion gear 276 on the door 56. The lever arm/axle combination 300 and spur gear 302 are supported on the inner and center vertically oriented planar members 196, 214 of the modular base component 22.

The lever arm/axle combination 300 is preferably formed as a single piece as shown in FIG. 30 and includes a lever arm generally designated by reference numeral 294 and an axle generally designated by reference numeral 296. The lever arm 294 has a knob 298 on the end that is engaged by right side arm 240 of the metal setting bar 238 during setting of the trap.

The axle 296 has a projecting end 304 that extends through the opening 216 in the center vertically oriented planar member 214, across the space 306 (see FIGS. 18 and 19) between the center and inner planar members 214, 196, and into the opening 206 in the inner planar member 196 where the end 304 of the axle 296 is supported on a base 308 (see FIG. 8). The projecting end 304 is formed to have parallel flats 310 that mate with corresponding flats 312 on the spur gear 302 as shown in FIG. 31. The axle 296 is also preferably provided with a projection 314 that is received within a correspondingly shaped cutout 316 on one of the spur gear flats 312 to allow installation of the spur gear 302 in only one direction.

Figure 32:
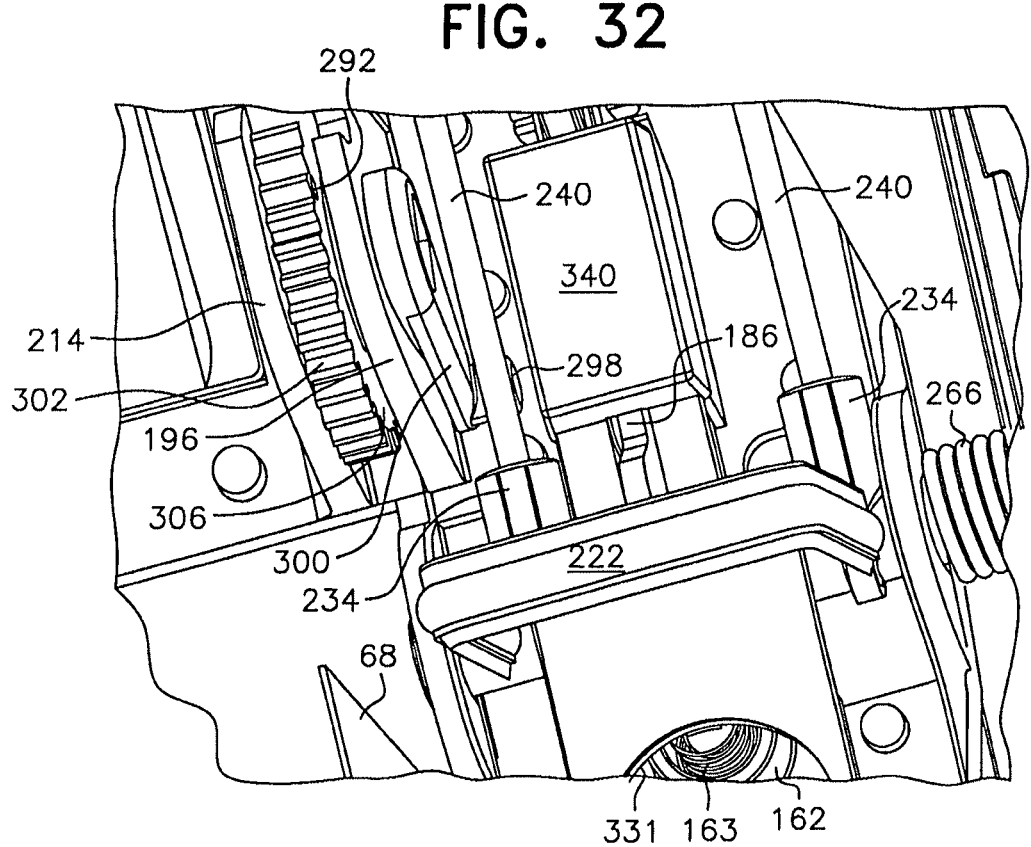
FIG. 32 is a perspective view of the position of the lever arm/axle combination of FIG. 30 when the trap is in the set position.

The spur gear 302 is positioned between the vertically oriented planar members 196, 214 of the modular base component 22 and has a central opening 320 to receive the axle 296. The flats 312 on the spur gear 292 extend into this opening 320 as shown in FIG. 31. The spur gear 302 is properly mounted on the axle 296 when the axle projection 314 is received within the spur gear cutout 320. Preferably, a small raised round feature 330 is formed on the axle flats 310 to help lock the spur gear 302 in place. As noted earlier, the spur gear 302 also includes a timing mark 292 that aligns in the unset position with the timing mark 290 on the partial pinion gear 276 of the door 56 during assembly. The position of the lever arm/axle combination 300 when assembled with the trap in a set condition is shown in FIG. 32.

As shown, with the setting of the kill bar 222, the setting bar 238 contacts the knob 298 on the end of the lever arm/axle combination 300, pushing the knob 298 downwardly. As the knob 298 moves downwardly, the lever arm/axle combination 300 and the spur gear 302 coupled thereto are rotated counterclockwise. The spur gear 302, in turn, rotates the pinion gear 276 on the door 56 clockwise to open the door.

With the door open and the setting bar 238 held in the recess 192 of the trip latch 172, a mouse can enter the trap 10 through the door opening 50. Drawn by the smell of the bait and guided by the dividing walls 66, 68, the mouse approaches the back end 342 of the bait pedal 32. When the mouse steps on the bait pedal and moves the back end downwardly, the tripping tip 184 is released from the bait pedal cutout 346 and the setting hook 190 releases the setting bar 238. The kill bar and setting bar rotate together with the setting axle under the force of the loaded set spring 266 to move rapidly to the kill position. Upon rotation of the setting bar, the knob 298 of the lever arm 294 is released and is free to move upwardly. The release allows the lever arm and axle combination 300 and the spur gear 302 to counter-rotate (in a clockwise direction). The force of the tensioned door spring 270 then actuates to close the door 56 while, at the same time, rotating the pinion gear 276 counter-clockwise which, in turn, rotates the spur gear 302. As the door 56 closes under the force of spring 270, the rubber seal 54 on the outside of the door mates with the door flange 53 on the inner wall of the housing to hermetically seal the enclosure 16. The mouse, now dead, is enclosed within the housing along with any parasites and pathogens associated therewith. The trap can then be safely disposed of without exposing the user to any contact with the carcass and any pathogens associated therewith.

The trap as described herein is both humane, killing the mouse in typically less than 30 seconds, and safe for both persons and pets around the trap. The trap can be baited and set from outside the enclosure, although during testing it has been found that baiting is not necessary as mice are naturally curious about small dark spaces such as that created by the housing. The user never has to see the dead mouse, and the trap securely contains all bacteria, parasites, urine, feces, etc., associated with the mouse indefinitely, making the trap suitable for use in locations that may not be convenient for regular servicing.

While the killing mechanism described herein is a snap-trap, the present invention may also be modified to include one of several other alternative killing/incapacitating mechanisms known in the art while retaining the hermetic sealing operation of the trap.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A single-use mousetrap comprising:
a housing defining an enclosure to which access is gained through an entrance;
a door movable to open and close the entrance; and
a trip mechanism inside the housing having a set position and a tripped position, said trip mechanism, when tripped by a mouse, moving from the set position to the tripped position and automatically closing said door over said entrance to hermetically seal said enclosure with the mouse and associated parasites and pathogens trapped inside, said trip mechanism including a kill bar and a setting member coupled to a setting axle in a fixed relationship to one another so that said kill bar and said setting member rotate with said setting axle, said setting axle being rotatable by a user to place the trip mechanism in the set position.

2. The single-use mousetrap as set forth in claim 1, wherein said hermetic sealing forms a vacuum inside the enclosure of between about 1.0 mmHg and 25.9 mmHg.

3. The single-use mousetrap as set forth in claim 1, wherein said hermetic seal can withstand a pressure of between about 0.125 inches $H_2O$ and about 55.4 inches $H_2O$.

4. The single-use mousetrap as set forth in claim 1, wherein said setting member includes a handle operatively coupled to the setting axle outside the enclosure, rotation of said handle rotating said setting axle to place the trip mechanism in said set position from outside the enclosure.

5. The single-use mousetrap as set forth in claim 4, further comprising a door opening and closing mechanism for opening and closing said door in response to placement of said trip mechanism in said set and tripped positions, respectively.

6. The single-use mousetrap as set forth in claim 1, wherein said trip mechanism further includes a trip latch and a bait pedal, both rotatably mounted on the setting axle inside the enclosure and configured to operate together to secure the trip mechanism in the set position.

7. The single-use mousetrap as set forth in claim 6, wherein the trip latch has a triggering tip at one end and a setting hook at an opposite end, said setting hook defining a recess for securing the setting bar in the set position, said bait pedal being mounted above said trip latch and having a cutout through which the triggering tip projects and is caught on an edge of the cutout in the set position, movement of the bait pedal by a mouse releasing the triggering tip to allow the trip latch to rotate and release the setting bar from the setting hook.

8. The single-use mousetrap as set forth in claim 5, wherein said door opening and closing mechanism includes an axle with an attached lever arm and a first gear engaged with said axle to be rotatable therewith, said first gear configured to engage with and rotate a second gear on said door when said lever arm is rotated, opening the door.

9. The single-use mousetrap as set forth in claim 8, wherein the setting bar engages the lever arm, causing it to rotate on the axle and, in turn, rotate the first and second gears, when the setting bar is moved to the set position by rotation of the setting handle.

10. The single-use mousetrap as set forth in claim 1, wherein the door includes a door spring that is tensioned when the door is open.

11. The single-use mousetrap as set forth in claim 8, wherein triggering of the trap from the set position allows the kill bar and setting member to move rapidly to a kill position, said movement of the setting member releasing the lever arm, allowing the gears to counter-rotate in response to the tensioned door spring which closes the door.

12. A single-use mousetrap comprising:
a housing defining an enclosure to which access is gained through an entrance opening;
a rotatably mounted door for closing the entrance opening, said door having a rubber seal that mates with a flange on an inside surface of the housing when the door closes;
a door opening and closing mechanism for rotating said door between an open position and a closed position;
a tripping mechanism positioned inside the enclosure, said tripping mechanism having a set position and a tripped position;
a setting member at least partly located outside said housing by which the tripping mechanism is placed in said set position from outside the enclosure; and
said door opening and closing mechanism being activated automatically to rotate said door to the closed position by movement of the tripping mechanism to the tripped position when the trap is triggered, closure of said door and mating said rubber seal with said flange on the housing inside surface hermetically sealing said enclosure with the mouse and associated pathogens and parasites trapped inside.

13. The single-use mousetrap as set forth in claim 12, wherein the tripping mechanism includes a kill bar and a setting bar coupled to a setting axle in a fixed relationship to one another so that said kill and setting bars rotate with said setting axle.

14. The single-use mousetrap as set forth in claim 13, wherein said tripping mechanism further includes a trip latch and a bait pedal, both rotatably mounted on the setting axle inside the enclosure and configured to operate together to secure the tripping mechanism in the set position, said trip latch having a triggering tip at one end and a setting hook at an opposite end, said setting hook defining a recess for securing the setting bar in the set position, said bait pedal being mounted above said trip latch and having a cutout through which the triggering tip projects and is caught on an edge of the cutout in the set position, movement of the bait pedal by a mouse releasing the triggering tip to allow the trip latch to rotate and release the setting bar from the setting hook.

15. The single-use mousetrap as set forth in claim 12, wherein the door includes a door spring that is tensioned when the door is in the open position.

16. The single-use mousetrap as set forth in claim 12, wherein said hermetic seal forms a vacuum inside the enclosure of between about 1.0 mmHg and 25.9 mmHg.

17. The single-use mousetrap as set forth in claim 16, wherein said hermetic seal can withstand a pressure of between about 0.125 inches $H_2O$ and about 55.4 inches $H_2O$.

18. The single-use mousetrap as set forth in claim 13, wherein said setting member includes a handle operatively coupled to the setting axle outside the enclosure, rotation of said handle rotating said setting axle to place the tripping mechanism in said set position.

19. A single-use mousetrap comprising:
a housing defining an enclosure to which access is gained through an entrance opening;
a rotatably mounted door for closing the entrance opening;
a door opening and closing mechanism for rotating said door between an open position and a closed position;
a tripping mechanism including a mechanical killing member positioned inside the enclosure, said tripping mechanism having a set position and a tripped position, said mechanical killing member being spring tensioned and, upon tripping of the tripping mechanism, is released to move downwardly to pin a mouse against the housing in said tripped position;
a setting member at least partly located outside said housing by which the tripping mechanism is placed in said set position from outside the enclosure; and
said door opening and closing mechanism being activated automatically to rotate said door to the closed position by movement of the tripping mechanism to the tripped position when the trap is triggered, closure of said door hermetically sealing said enclosure with the mouse and associated pathogens and parasites trapped inside.

20. The single-use mousetrap as set forth in claim 19, wherein the tripping mechanism includes a setting bar and said mechanical killing member includes a kill bar, said kill bar and said setting bar being coupled to a setting axle in a fixed relationship to one another so that said kill and setting bars rotate with said setting axle.

21. The single-use mousetrap as set forth in claim 20, wherein said setting member includes a handle operatively coupled to the setting axle outside the enclosure, rotation of said handle rotating said setting axle to place the tripping mechanism in the set position.

22. The single-use mousetrap as set forth in claim 19, wherein said door has a seal that mates with a flange on an inside surface of the housing when the door closes to form said hermetic seal.

* * * * *